(12) United States Patent
Azuma

(10) Patent No.: US 9,360,665 B2
(45) Date of Patent: Jun. 7, 2016

(54) CONFOCAL OPTICAL SCANNER

(71) Applicant: YOKOGAWA ELECTRIC CORPORATION, Musashino-shi, Tokyo (JP)

(72) Inventor: Takuya Azuma, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/620,272

(22) Filed: Feb. 12, 2015

(65) Prior Publication Data
US 2015/0234178 A1 Aug. 20, 2015

(30) Foreign Application Priority Data
Feb. 17, 2014 (JP) .................................. 2014-027918

(51) Int. Cl.
G02B 26/08 (2006.01)
G02B 26/10 (2006.01)
G02B 21/00 (2006.01)

(52) U.S. Cl.
CPC ........ *G02B 26/0875* (2013.01); *G02B 21/0044* (2013.01); *G02B 26/10* (2013.01); *G02B 26/105* (2013.01); *G02B 21/0048* (2013.01); *G02B 21/0076* (2013.01)

(58) Field of Classification Search
CPC .. G02B 26/0875; G02B 26/10; G02B 26/105; G02B 21/0044; G02B 21/0048; G02B 21/0076
USPC ............ 359/201.1, 201.2, 368, 385, 388, 389
See application file for complete search history.

(56) References Cited

U.S. PATENT DOCUMENTS

| 5,659,420 | A | * | 8/1997 | Wakai | G01B 11/026 356/511 |
|---|---|---|---|---|---|
| 5,737,084 | A | | 4/1998 | Ishihara | |
| 5,737,121 | A | | 4/1998 | Dixon | |
| 6,774,340 | B1 | * | 8/2004 | Chiba | B23K 26/0656 219/121.68 |
| 7,223,232 | B2 | * | 5/2007 | Mizuno | A61B 5/0068 250/461.2 |
| 7,583,444 | B1 | * | 9/2009 | DeVoe | B29D 11/00153 359/618 |
| 2001/0001581 | A1 | * | 5/2001 | Tanaami | G02B 21/0044 359/368 |
| 2004/0032650 | A1 | | 2/2004 | Lauer | |
| 2005/0046935 | A1 | * | 3/2005 | Tanaami | G02B 21/0024 359/380 |
| 2005/0094261 | A1 | | 5/2005 | Hell et al. | |

(Continued)

FOREIGN PATENT DOCUMENTS

DE 102007009551 B3 8/2008
DE 10 2012 203 736 A1 9/2013

(Continued)

OTHER PUBLICATIONS

Olaf Schulz, et al., "Resolution doubling in fluorescence microscopy with confocal spinning-disk image scanning microscopy", PNAS, Dec. 24, 2013, pp. 21000-21005, vol. 110, No. 52.

*Primary Examiner* — Frank Font
(74) *Attorney, Agent, or Firm* — Sughrue Mion, PLLC

(57) ABSTRACT

A confocal optical scanner according to one aspect of the present invention includes an optical filter. The optical filter includes a plate-shaped body including a first surface and a second surface opposite to the first surface. The first surface has a plurality of pinholes. The optical filter further includes a plurality of first microlenses on the second surface. The first microlenses are disposed nearly coaxially with the pinholes, respectively.

14 Claims, 20 Drawing Sheets

(56) References Cited

U.S. PATENT DOCUMENTS

| | | | |
|---|---|---|---|
| 2006/0011832 A1* | 1/2006 | Wolleschensky | G02B 21/0072 250/310 |
| 2007/0096014 A1* | 5/2007 | Mikuriya | G02B 21/0044 250/216 |
| 2008/0218849 A1 | 9/2008 | Uhl et al. | |
| 2009/0279159 A1 | 11/2009 | Uhl et al. | |
| 2011/0090553 A1* | 4/2011 | Kei | G02B 21/0032 359/235 |
| 2011/0134516 A1* | 6/2011 | Araya | G02B 21/0004 359/371 |
| 2011/0134519 A1* | 6/2011 | Cooper | G02B 21/0032 359/385 |
| 2011/0155999 A1* | 6/2011 | Tansu | H01L 33/22 257/13 |
| 2011/0181930 A1* | 7/2011 | Sugita | F16C 17/08 359/200.7 |
| 2011/0216404 A1* | 9/2011 | Nezu | G02B 21/24 359/385 |
| 2011/0300490 A1* | 12/2011 | Rachet | G02B 21/0032 430/322 |
| 2012/0081535 A1* | 4/2012 | Hayashi | G02B 21/0032 348/79 |
| 2012/0281258 A1* | 11/2012 | Sheblee | G02B 21/0044 358/474 |
| 2013/0148184 A1* | 6/2013 | Azuma | G02B 21/08 359/223.1 |
| 2013/0229493 A1* | 9/2013 | Ikuta | G02B 21/32 348/46 |
| 2014/0036057 A1 | 2/2014 | Hayashi | |
| 2014/0043460 A1* | 2/2014 | Hartell | G02B 17/0615 348/79 |
| 2014/0152797 A1* | 6/2014 | Mitsuhiro | G01N 21/8806 348/79 |
| 2015/0145981 A1 | 5/2015 | Anhut et al. | |

FOREIGN PATENT DOCUMENTS

| | | |
|---|---|---|
| JP | 489906 U | 8/1992 |
| JP | 09-133870 A | 5/1997 |
| JP | 9230245 A | 9/1997 |
| JP | 9257440 A | 10/1997 |
| JP | 1062691 A | 3/1998 |
| JP | 200166124 A | 3/2001 |
| JP | 2004509370 A | 3/2004 |
| JP | 2008268243 A | 11/2008 |
| JP | 2013113689 A | 6/2013 |
| JP | 5412394 B2 | 2/2014 |
| WO | 2013/126762 A1 | 8/2013 |

* cited by examiner

Prior Art

CONFOCAL OPTICAL SCANNER

BACKGROUND OF THE INVENTION

1. Field of the Invention

The present invention relates to a confocal optical scanner configured to acquire rapidly (in real time) super resolution images where influence of spurious resolution and artifacts due to image processing is inhibited.

Priority is claimed on Japanese Patent Application No. 2014-027918, filed Feb. 17, 2014, the contents of which are incorporated herein by reference.

2. Description of Related Art

Hereinafter, three related arts in the technical field of confocal optical scanner will be described with reference to drawings.

(A) Related Art 1

A technique for acquiring images of a specimen, which have a resolution higher than the resolution limit of optical system (Abbe diffraction limit), has been developed and put to practical use. Hereinafter, such a technique is referred to as a super resolution technique. An example of super resolution technique includes a technique described in Japanese Patent Application Laid-Open Publication No. 2012-78408 (Japanese Patent No. 5412394).

(A1) Configuration and Operation of Related Art 1

FIG. 16 is a schematic diagram showing one configuration example of confocal optical scanner in Related Art 1. FIG. 16 shows a fourth embodiment (FIG. 10A) described in Japanese Patent Application Laid-Open Publication No. 2012-78408 (Japanese Patent No. 5412394). Hereinafter, the configuration and operation of confocal optical scanner in Related Art 1 will be described with reference to FIG. 16.

A confocal optical scanner 100 includes a microlens disk 102, on which a plurality of microlenses 102a is regularly disposed, a pinhole disk 103, on which pinholes 103a are disposed, and a motor 104 for rotating the microlens disk 102 and the pinhole disk 103. Each pinhole 103a is an opening of a light shielding mask 103b and is positioned opposite to the microlens 102a.

A light source device 105 includes a light source such as a laser and an optical system, which are not shown, and is configured to output collimated illumination light. The illumination light input into the confocal optical scanner 100 is divided into a plurality of illumination light beamlets by the plurality of microlenses 102a disposed on the microlens disk 102. The divided illumination light is transmitted through a beam splitter 106 and passes through the pinhole positioned opposite to the microlens 102a, through which the illumination light has been passed, among the plurality of pinholes 103a disposed on the pinhole disk 103. In order to make the illumination light be passed through each pinhole 103a, each pinhole 103a is disposed on the focal plane of the microlens 102a.

The illumination light, which has been passed through the pinhole disk 103, is condensed onto a specimen 108 by an objective lens 107. The specimen 108 outputs return light based on the illumination light. In particular, in a case of observation of a fluorescent specimen, the specimen 108 is stained using a fluorescent dye so as to have a specific structure. The fluorescent dye molecule of the specimen 108 is excited by the illumination light and the specimen 108 outputs fluorescence having a longer wavelength than the illumination light.

The return light captured by the objective lens 107 is condensed onto the pinhole disk 103 provided in the confocal optical scanner 100. At this time, only return light from the focal plane of the objective lens 107 facing the specimen passes through the pinhole 103a. On the other hand, since return light from other than the focal plane is not focused on the pinhole 103a and is shielded by the light shielding mask 103b disposed on the pinhole disk 103, most of the return light cannot pass through the pinhole 103a.

The return light, which has passed through the pinhole 103a, is reflected by the beam splitter 106. In particular, in a case of fluorescent observation, the beam splitter 106 is for dispersing light based on a wavelength and has a short pass characteristic where illumination light is transmitted and return light, which is fluorescence and has a longer wavelength than the illumination light, is reflected. The return light reflected by the beam splitter 106 forms an image on a camera 110 by an imaging lens 109.

At the same time, the microlens disk 102 and the pinhole disk 103 are rotated by the motor 104, and the whole of specimen 108 is scanned using illumination light. This enables a confocal image (optical cross-sectional image) of the specimen 108 to be imaged using the camera 110.

At this time, the illumination light, which has a spatial intensity distribution modulated by the pinhole pattern of the light shielding mask 103b, is projected on the specimen 108. Thereby, in the return light from the specimen 108, a part of high-frequency component beyond a resolution limit of optical system is shifted to a frequency below the resolution limit. In addition, by adopting the configuration where the return light passes through the pinhole pattern of the light shielding mask 103b, the shifted band is demodulated into the original high-frequency component. Therefore, a confocal image having a high-frequency component beyond a resolution limit of optical system is imaged by the camera 110. Since the high-frequency component beyond a resolution limit of optical system has low contrast compared to a low-frequency component and cannot be sufficiently visualized as an image, the high-frequency component is subjected to a high-frequency enhancement process using an image processing board 111 and a personal computer 112. Therefore, a confocal image where a high-frequency component beyond a resolution limit of optical system is sufficiently visible can be obtained.

(A2) Problems in Related Art 1

As described above, in order to obtain a confocal image where a high-frequency component beyond a resolution limit of optical system is sufficiently visible, it is necessary to subject a confocal image imaged by a camera to a high-frequency enhancement process. Therefore, various spurious resolution and artifacts occur due to noise components included in a confocal image imaged by a camera.

In the field of natural science for observing "nature" (for example, a field for observing a biological specimen, a cell, and the like using a microscope), there are some cases where "artifacts (data distortion and errors occurred in an observation and analysis process, and the like)" occur.

Since parameters such as strength and a band in the high-frequency enhancement process are not obvious, it is necessary to determine parameters by trial and error for each image so as to prevent occurrence of spurious resolution and artifacts in images obtained by performing the high-frequency enhancement process. In addition, it is impossible to determine whether the high-frequency components, which are visualized as a result of the process, are generated based on the microscopic structure of actual specimen or are generated due to spurious resolution.

The high-frequency enhancement process improves the resolution of image in the imaging plane (X-Y plane), but does not improve the resolution of image in the light axis direction (Z-axis direction) perpendicular to the image.

Therefore, there are some cases where it is not easy to observe in detail the spatial structure of specimen.

Since the high-frequency enhancement process requires a long processing time, there are some cases where it is not easy to display super resolution images in real time. In addition, since the high-frequency enhancement process requires a personal computer with high performance and an image processing board, there are some cases where the device configuration is complicated and expensive.

(B) Related Art 2

Examples of confocal microscope having a super-resolution effect include, for example, an "Image Scanning Microscopy (ISM)" method described in Schulz, O. et al. Resolution doubling in fluorescence microscopy with confocal spinning-disk image scanning microscopy, Proceedings of the National Academy of Sciences of United States of America, Vol. 110, pp. 21000-21005 (2013). Hereinafter, the configuration and operations of the confocal microscope will be described with reference to FIG. 17.

(B1) Configuration and Operation of Related Art 2

FIG. 17 is a schematic diagram showing one configuration example of confocal microscope in the related art. Hereinafter, the configuration and operation of the confocal microscope will be described with reference to FIG. 17.

An ISM confocal microscope uses a similar confocal optical scanner to that of Related Art 1. A confocal optical scanner 200 includes a shutter 205a in a light source device 205. In addition, the confocal optical scanner 200 includes a motor 204 and a synchronization controller 213 for synchronizing the shutter 205a and a camera 210.

The shutter 205a allows illumination light from the light source device 205 to pass through for only a short time, a few microseconds at each photographing and outputs stroboscopic light. In the short illumination period, the pinhole 203 rotated by the motor 204 is considered to have a stopped state. Therefore, by adopting the configuration where the camera 210 performs an imaging for a short time, which is the same as the illumination period, confocal images in the nearly stopped state (non-scanning confocal image) can be obtained without scanning a specimen 208 with illumination light. Since the non-scanning confocal image is generated by imaging only return light from the positions on the specimen 208, which are opposite to a plurality of pinholes 203a in the pinhole pattern of a light shielding mask 203b, a plurality of bright points is recorded in one image.

A few hundred non-scanning confocal images as described above are imaged with performing a synchronization control of the motor 204, the shutter 205a, and the camera 210 using the synchronization controller 213.

When the non-scanning confocal images are imaged, the synchronization control is performed so that the opening-closing timing of the shutter 205a for the rotation of the motor 204 is deviated at a regular interval. Thereby, the position of each of the bright points is slightly different in each image and the whole of image is filled with the bright points by superimposing all images.

The following image processing is performed for a few hundred non-scanning confocal images obtained as described above. The central coordinate of each of the plurality of bright points recorded in the non-scanning confocal image is calculated, and pixels near the bright point are shifted so that the distance to the center is half of the original distance. In other words, the image processing for decreasing the size of each of the plurality of bright points so as to be half of the original size is performed. Finally, a super resolution image is obtained by superimposing a few hundred non-scanning confocal images subjected to the bright point decreasing process.

Hereinafter, reasons for acquisition of super resolution images will be described with reference to FIGS. 18 and 19. FIG. 18 is a schematic diagram showing a confocal optical system using a two-dimensional image sensor (camera). In order to simplify the diagram, an illumination side and an imaging side are separately shown. The illumination side indicates a region from a point light source to a specimen plane, and the imaging side indicates a region from the specimen plane to an imaging plane. In order to simplify the diagram, the magnification of objective lens is set to 1×, but an objective lens having a magnification other than 1× may be used. When the magnification of objective lens is set to 1×, the specimen plane and the imaging plane are the same in the scale as each other and are opposite in the scale direction to each other.

The illumination light output from the point light source on the optical axis is focused on the specimen plane by the objective lens. At this time, the light diffraction causes the intensity distribution of illumination light on the specimen plane to have a certain extent centered at the coordinate x=zero as shown in FIG. 18. The extent of light is generally referred to as Airy disc. Next, return light, which is generated by exposing the specimen to the illumination light and is output from three points at the coordinates, x=zero, d/2 and d on the specimen plane, will be considered. A description will be provided for the case where these three points exist in the Airy disc of the illumination light. In FIG. 18, first to third curved lines are shown in front of the imaging plane. The first curved line corresponds to the intensity distribution curved line of return light output from the coordinate x=zero on the specimen plane. The second curved line corresponds to the intensity distribution curved line of return light output from the coordinate x=d/2 on the specimen plane. The third curved line corresponds to the intensity distribution curved line of return light output from the coordinate x=d on the specimen plane. As shown in FIG. 18, the first intensity distribution curved line has the peak at the coordinate x=zero on the imaging plane, and the peak height is proportional to the illumination light intensity at the coordinate x=zero on the specimen plane. The second intensity distribution curved line has the peak at the coordinate x=d/2 on the imaging plane, and the peak height is proportional to the illumination light intensity at the coordinate x=d/2 on the specimen plane. The third intensity distribution curved line has the peak at the coordinate x=d on the imaging plane, and the peak height is proportional to the illumination light intensity at the coordinate x=d on the specimen plane.

The return light is received by a two-dimensional image sensor (camera) provided on the imaging plane. The amount of light received at the position of the coordinate x=d on the imaging plane (the position corresponding to Pixel 2 shown in FIG. 18) will be considered. In FIG. 18, the intensity distributions of return light output from the coordinates x=zero, d/2, and d on the specimen are compared to one another at the coordinate x=d on the imaging plane. This shows that the intensity of the return light from the coordinate x=d/2 on the specimen plane is the largest. In other words, the pixel at the position of the coordinate x=d on the imaging plane receives the brightest light which is not return light from the coordinate x=d on the specimen plane, but return light from the coordinate x=d/2 on the specimen plane. This shows that, in the microscopic area of the Airy disc, the distribution on the specimen plane is increased to twice and projected on the imaging plane.

The above-described optical phenomenon is explained using equations as follows. When a position on specimen plane where return light occurs is defines as x and an amount of light received at a position on imaging plane d is defined as I(x), the amount of light received I(x) is represented by the following equation (1).

Where, $\text{PSF}_{ill}(x)$ and $\text{PSF}_{img}(x)$ are a point spread function on the illumination side and a point spread function on the imaging side, respectively.

$$I(x) = \text{PSF}_{ill}(x) \times \text{PSF}_{img}(x-d) \quad (1)$$

Generally, the point spread function PSF(x) is represented by the following equation (2) using Bessel function of the first kind $J_1$, and a numerical aperture NA and a wavelength λ of an optical system.

$$PSF(x) = \left( \frac{J_1(2\pi \cdot NA \cdot x/\lambda)}{\pi \cdot NA \cdot x/\lambda} \right)^2 \quad (2)$$

According to the equation (1), I(x) is represented as a product of two point spread functions where the peak position of one of the point spread functions is different from that of the other by a distance d. Therefore, the sketch of I(x) has a peak at d/2 as shown in FIG. 19 (horizontal axis: coordinate, vertical axis: light intensity). In other words, the equation (1) also indicates that the pixel at the position of the coordinate x=d on the imaging plane receives the brightest light which is return light from the coordinate x=d/2 on the specimen plane.

As described above, in the confocal optical system using the two-dimensional image sensor (camera), the distribution of images on the specimen plane is increased to twice and projected on the imaging plane in the region of the Airy disc centered each bright point of the non-scanning confocal image. Thereby, by reducing the distribution of images in the Airy disc to half and performing a correction process for conforming the coordinate on the specimen plane to the coordinate on the imaging plane, the high-frequency component beyond a resolution limit of optical system can be obtained. The reason is that the process for reducing the distribution of images in the Airy disc to half corresponds to a process for reducing the width of the point spread function of the optical system to half. Thereby, super resolution images having a resolution, which is twice as large as the resolution limit (diffraction limit) of an optical system, can be obtained.

(B2) Problems in Related Art 2

As described above, the technique in Related Art 2 requires imaging of a few hundred non-scanning confocal images for obtaining one super resolution image. At this time, since the imaging of the one super resolution image requires several tens of seconds, the time resolution is low and it is not easy to capture a rapid phenomenon. Therefore, there are some cases where it is difficult to display super resolution images in real time.

In addition, since the technique in Related Art 2 requires a rapid shutter, a synchronization control device, and a personal computer with high performance, there are some cases where the device configuration is complicated and expensive.

In addition, the technique in Related Art 2 improves the resolution of image in the imaging plane (X-Y plane), but does not improve the resolution of image in the light axis direction (Z-axis direction) perpendicular to the image. Therefore, there are some cases where it is not easy to observe in detail the spatial structure of specimen.

(C) Related Art 3

Other Examples of confocal microscope having a super-resolution effect include, for example, a "Multi-Focal Structured Illumination Microscopy" method described in WO 2013/126762. Hereinafter, the configuration and operation of the "Multi-Focal Structured Illumination Microscopy" method will be described with reference to FIG. 20.

(C1) Configuration and Operation of Related Art 3

A confocal optical scanner 350 includes microlens arrays 341, 352 and 353, a pinhole array 351, a galvanic mirror 349, a beam splitter 306, relay lenses 343, 344 and 345, and mirrors 346 and 347. In each of the microlens arrays 341, 352 and 353, a plurality of microlenses is regularly disposed.

The pinhole array 351 includes a plurality of pinholes 351a. Each pinhole 351a is disposed on a position, which optically corresponds to (is conjugate to) the focal position of each microlens 341a included in the microlens array 341. The pinhole 351a is an opening of a light shielding mask 351b. The microlens array 352 includes a plurality of microlenses 352a. Each microlens 352a is disposed on a position, which corresponds to each pinhole 351a included in the pinhole array 351. In addition, the microlens array 353 includes a plurality of microlenses 353a. Each microlens 353a is disposed on a position, which corresponds to each microlens 352a included in the microlens array 352. Each microlens 341a, 352a, and 353a may be replaced by another optical element (for example, a Fresnel lens and a diffractive-optical element) as long as the another optical element has a lens effect.

The interval between the pinhole array 351 and the microlens array 352 is equal to the focal length of each microlens 352a included in the microlens array 352. Therefore, the microlens array 352 converts the beam input from the side facing the pinhole array 351 so that the converted light is parallel light in the space where the converted light output from the microlens array 352 exists. The focal length of each microlens 353a included in the microlens array 353 is set to half of the focal length of the microlens 352a. Therefore, the microlens arrays 352 and 353 convert the beam input from the pinhole array 351 so that the converted beam has a numerical aperture which is twice as large as that of the light before being input into the microlens array 352 in the space where the converted beam output from the microlens array 353 exists.

A light source device 305 includes a light source such as a laser and an optical system, which are not shown, and outputs collimated illumination light. The illumination light is divided into a plurality of illumination light beamlets by the microlens array 341. The microlens array 341 may be designed so that the numerical aperture of the illumination light beamlet is close to or greater than a value obtained by dividing a numerical aperture of an objective lens 307 by the magnification.

The illumination light passes through the beam splitter 306 and the relay lens 343, is reflected by the galvanic mirror 349, passes through the relay lens 344 and the objective lens 307, and is condensed onto a specimen 308. At this time, by varying the direction of the surface of the galvanic mirror 349, the whole of specimen 308 is scanned using the illumination light.

The specimen 308 outputs return light based on the illumination light. In particular, in a case of observation of a fluorescent specimen, the specimen 308 is stained using a fluorescent dye so as to have a specific structure. The fluorescent dye molecule is excited by the illumination light and the specimen 308 outputs fluorescence having a longer wavelength than the illumination light.

The return light captured by the objective lens 307 passes through the relay lens 344, is reflected (descanned) by the galvanic mirror 349, passes through the relay lens 343, and is reflected by the beam splitter 306. In particular, in a case of fluorescent observation, the beam splitter 306 is for dispersing light based on a wavelength and has a short pass characteristic where illumination light is transmitted and return light, which is fluorescence and has a longer wavelength than the illumination light, is reflected.

The return light reflected by the beam splitter 306 is focused on the pinhole array 351 and passes through the pinhole 351a. At this time, only return light from the focal plane of the objective lens 307 facing the specimen passes through the pinhole 351a. On the other hand, since return light from other than the focal plane is not focused on the pinhole 351a and is shielded by the light shielding mask 351b included in the pinhole array 351, most of the return light cannot pass through the pinhole 351a.

The return light, which has passed through the pinhole 351a, is converted into beam having a numerical aperture which is twice as large as that of the light before being input into the microlens array 352, by the microlens arrays 352 and 353.

The return light, which has passed through the microlens array 353, passes through the relay lens 345, the mirror 346, and the mirror 347, is reflected (rescanned) by the galvanic mirror 349, and is focused on a camera 310 by an imaging lens 348. At this time, the numerical aperture of each of the relay lens 345 and the imaging lens 348 may be close to or greater than that of the return light, which has been converted by the microlens arrays 352 and 353 so as to have the numerical aperture which is twice as large as that of the light before being input into the microlens array 352.

At the same time, the direction of the surface of the galvanic mirror 349 is varied to scan the whole of specimen 308 using the illumination light and the return light from the specimen 308 is scanned and projected on the camera 310. This enables the super resolution confocal images of the specimen 308 to be imaged using the camera 310.

As described above with reference to FIGS. 18 and 19, in the "Related Art 2", in the confocal optical system using the two dimensional image sensor (camera), the distribution of images on the specimen plane is increased to twice and projected on the imaging plane in the region of the Airy disc centered each bright point. Therefore, by reducing the distribution of images in the Airy disc to half and performing a correction process for conforming the coordinates on the specimen plane to the coordinates on the imaging plane, the high-frequency component beyond the resolution limit of optical system can be obtained. On the other hand, in the "Related Art 3", the reduction of the distribution of images in the Airy disc to half is optically performed. The reason is that, by increasing the numerical aperture of the return light from the objective lens 307 to twice as large as before by the microlens arrays 352 and 353, the width of the point spread function of the optical system becomes half in accordance with the equation (2), in other words, the distribution of images in the Airy disc, which are reduced to half, is projected on the camera 310.

In addition, in the "Related Art 2", it is necessary to image a few hundred non-scanning confocal images and to integrate them. On the other hand, according to the "Related Art 3", since the distribution of images in the Airy disc is optically reduced to half and the reduced distribution is imaged by the camera 310, it is only necessary to perform one imaging during the scanning of the whole of the specimen 308 with varying the direction of the surface of the galvanic mirror 349. Therefore, super resolution images having a resolution, which is twice as large as the resolution limit (diffraction limit) of optical system, can be easily obtained in a short time.

(C2) Problems in Related Art 3

In order to implement the Related Art 3, it is important to stably ensure the following three points.

- It is necessary to precisely dispose the microlenses 341a included in the microlens array 341 and the pinholes 351a included in the pinhole array 351 so that the focal position of each microlens 341a included in the microlens array 341 optically corresponds to (is conjugate to) the position of each pinhole 351a included in the pinhole array 351.
- It is necessary to precisely dispose each pinhole 351a included in the pinhole array 351 on the focal position of each microlens 352a included in the microlens array 352.
- It is necessary to precisely dispose each microlens 353a included in the microlens array 353 so that each microlens 353a has the same axis as the microlens 352a included in the microlens array 352.

As described above, it is necessary to precisely dispose each of a plurality of micro optical elements (the microlens arrays 341, 352 and 353, and the pinhole array 351). The micro optical elements are spatially separated from one another. Therefore, there are some cases where the Related Art 3 requires a plurality of precise position and angle adjustment mechanisms, the configuration is complicated and expensive, and the optical adjustment is not easy. In addition, in the Related Art 3, since the micro optical elements are spatially separated from one another, there are some cases where the relative position among the micro optical elements is changed due to a changing in circumstances such as a temperature, the optical adjustment easily collapses, and the micro optical elements cannot be stably used in a long time.

SUMMARY OF THE INVENTION

One aspect of the present invention provides a confocal optical scanner configured to acquire rapidly (in real time) super resolution images where influences of spurious resolution and artifacts due to image processing are inhibited. The configuration of the confocal optical scanner is simple and inexpensive. The optical adjustment of the confocal optical scanner is easy and has high environmental stability. In addition, the confocal optical scanner has a super-resolution effect not only in an x-y plane of image, but also in an axial direction (z-axis direction) and is suitable for a fine observation of a three-dimensional structure of a specimen.

A confocal optical scanner according to one aspect of the present invention may include an optical filter. The optical filter may include a plate-shaped body including a first surface and a second surface opposite to the first surface. The first surface may have a plurality of pinholes. The optical filter may include a plurality of first microlenses on the second surface. The first microlenses may be disposed nearly coaxially with the pinholes, respectively.

The confocal optical scanner according to the one aspect may further include a motor connected to the body and configured to rotate the optical filter. The optical filter may be a disk-shaped filter. Each first microlense may be a convex lens. The first microlenses may be disposed on one surface of the optical filter. The one surface of the optical filter may face a specimen.

The confocal optical scanner according to the one aspect may further include a motor connected to the body and configured to rotate the optical filter. The optical filter may be a disk-shaped filter. Each first microlense may be a concave lens. The first microlenses may be disposed on one surface of the optical filter. The one surface of the optical filter may be opposite to the other surface facing a specimen.

The confocal optical scanner according to the one aspect may further include a galvanic mirror. A direction of a surface of the galvanic mirror may be variable. The optical filter may be an array type filter. Each first microlense may be a convex lens. The first microlenses may be disposed on an incidence surface of the optical filter.

The confocal optical scanner according to the one aspect may further include a galvanic mirror. A direction of a surface of the galvanic mirror may be variable. The optical filter may be an array type filter. Each first microlense may be a concave lens. The first microlenses may be disposed on a light emitting surface of the optical filter.

The confocal optical scanner according to the one aspect may further include a motor connected to the body and configured to rotate the optical filter. The optical filter may be a disk-shaped filter. Each first microlense may be a concave lens disposed on one surface of the body. The one surface of the body may face a specimen. The optical filter may include concave mirrors disposed on the other surface of the body. The other surface of the body may be opposite to the one surface facing the specimen. Each pinhole may be disposed coaxially with the center of each concave mirror.

The confocal optical scanner according to the one aspect may further include an intermediate variable magnification optical system.

In the confocal optical scanner according to the one aspect, the optical filter may be configured to increase a numerical aperture of light input from a specimen and to output the light having the increased numerical aperture.

In the confocal optical scanner according to the one aspect, the optical filter may be configured to increase the numerical aperture of the light input from the specimen in the range of 1.2 times to 4 times as large as before, and to output the light having the increased numerical aperture.

In the confocal optical scanner according to the one aspect, the optical filter may include a light shielding mask disposed on the first surface of the body. Each pinhole may be an opening of the light shielding mask.

The confocal optical scanner according to the one aspect may further include a microlens disk. A plurality of second microlenses may be disposed on the microlens disk.

In the confocal optical scanner according to the one aspect, each second microlens may be configured to divide illumination light into a plurality of illumination light beamlets. Each pinhole may be configured to allow one illumination light beamlet of the illumination light beamlets, which has been passed through the second microlens positioned opposite to the pinhole, to pass through.

In the confocal optical scanner according to the one aspect, each first microlens may be configured to reduce a numerical aperture of the illumination light beamlet and to output the illumination light beamlet having the reduced numerical aperture.

In the confocal optical scanner according to the one aspect, the intermediate variable magnification optical system may include a first lens and a second lens.

In the confocal optical scanner according to the one aspect, the intermediate variable magnification optical system may be configured to increase a numerical aperture of light input from the first lens and to output the light having the increased numerical aperture from the second lens and to reduce a numerical aperture of light input from the second lens and to output the light having the reduced numerical aperture from the first lens.

A confocal optical scanner according to one aspect of the present invention includes an optical filter including a plurality of pinholes and a scanner configured to expose a specimen to light to scan the specimen. The optical filter includes a plate-shaped body, the pinholes disposed on one main surface of the body, and microlenses disposed on the other main surface of the body. The pinholes are disposed nearly coaxially with the microlenses, respectively.

According to the above-described configuration, a pinhole disk with microlenses can change a numerical aperture of return light from an objective lens. Therefore, a width of a point spread function of an optical system is reduced, in other words, the distribution of images in an Airy disc is reduced and the reduce distribution is projected on a camera.

Thereby, one aspect of the present invention can provide a confocal optical scanner configured to acquire rapidly (in real time) super resolution images where influences of spurious resolution and artifacts due to image processing are inhibited. The configuration of the confocal optical scanner is simple and inexpensive. The optical adjustment of the confocal optical scanner is easy and has high environmental stability.

In addition, since the confocal optical scanner having the above-described configuration has a super-resolution effect not only in an x-y plane of image, but also in an axial direction (z-axis direction), the confocal optical scanner is suitable for a fine observation of a three-dimensional structure of a specimen.

DETAILED DESCRIPTION OF THE INVENTION

Hereinafter, confocal optical scanners according to several embodiments of the present invention will be described with reference to the drawings.

First Embodiment

A confocal optical scanner according to a first embodiment of the present invention will be described.

Figure 1:
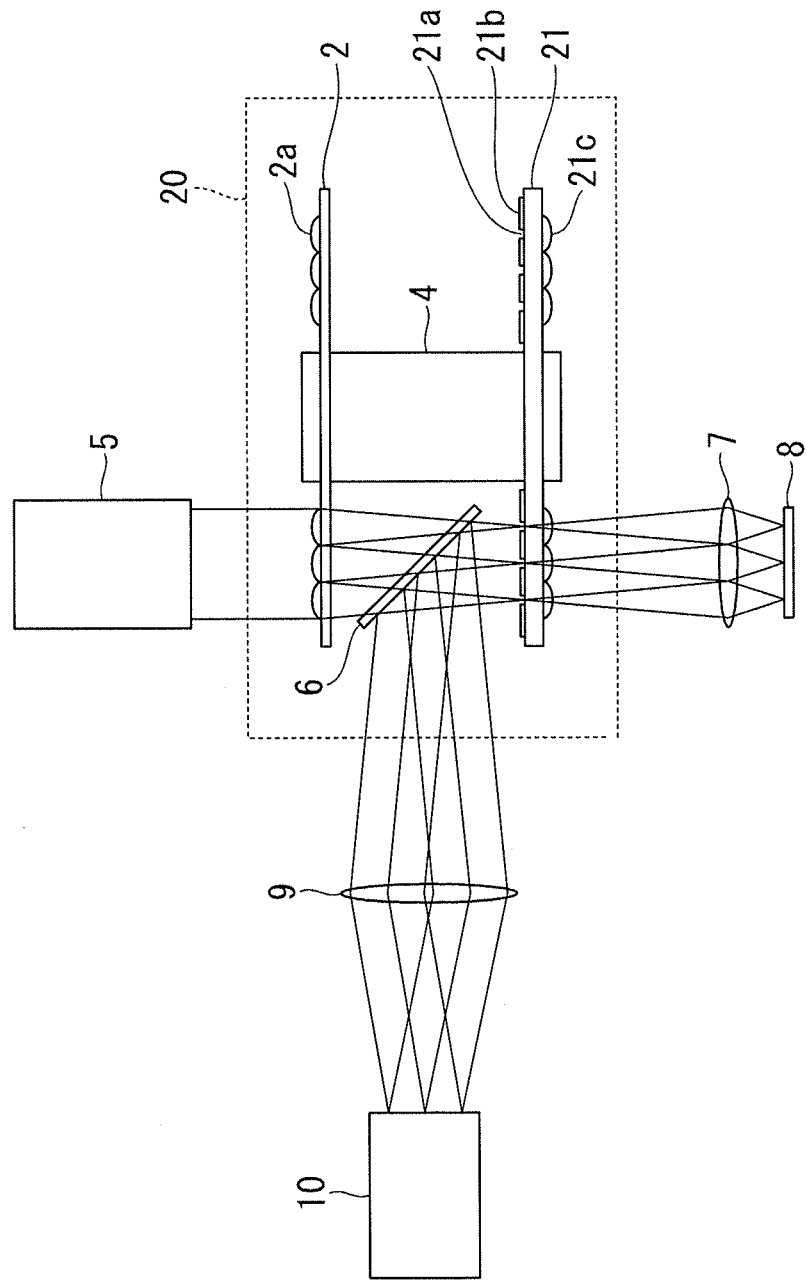
FIG. 1 is a diagram schematically showing one confocal optical scanner (first embodiment) according to the present invention.

FIG. 1 is a diagram schematically showing one configuration example of the confocal optical scanner according to the first embodiment.

The confocal optical scanner includes an optical filter including a plurality of pinholes and a scanner configured to expose a specimen to light to scan the specimen.

In the confocal optical scanner according to the first embodiment, the optical filter includes a plate-shaped body, the pinholes disposed on one main surface of the body, and microlenses disposed on the other main surface of the body. The pinholes are disposed nearly coaxially with the microlenses, respectively.

The optical filter is a disk-shaped filter. Each microlens is a convex lens. The microlenses are disposed on the main face of the optical filer facing the specimen. In other words, in the confocal optical scanner according to the first embodiment, the optical filter includes a plate, pinholes on one face of the plate, and microlenses on the other face opposite to the one face of the plate. The pinholes are disposed nearly coaxially with the microlenses, respectively.

The configuration and operation of a confocal optical scanner 20 according to the first embodiment will be described with reference to FIG. 1.

The confocal optical scanner 20 includes a microlens disk 2, on which a plurality of microlenses 2a is regularly disposed, a pinhole disk with microlens 21 (optical filter), and a motor 4 (scanning device) for rotating the microlens disk 2 and the pinhole disk with microlens 21.

Pinholes 21a are provided on the pinhole disk with microlens 21. Each pinhole 21a is an opening of a light shielding mask 21b. The pinholes 21a are disposed respectively opposite to the microlenses 2a of the microlens disk 2. In addition, the pinholes 21a, which are provided on the main face of the pinhole disk with microlens 21, are provided nearly coaxially with the microlenses 21c, which are disposed on the other face opposite to the main face, respectively. Misalignment between the central axis of the pinhole 21a and the central axis of the microlens 21c may be equal to or less than 100 micrometer. Each microlens 2a and 21c may be another optical element, for example, a Fresnel lens and a diffractive-optical element, as long as the another optical element includes a lens effect.

The pinhole disk with microlens 21 increases a numerical aperture of light input from a specimen in the range of 1.2 times to 4 times as large as before, and outputs the light having the increased numerical aperture.

Hereinafter, a description will be provided for the case in which the pinhole disk with microlens 21 increases a numerical aperture of light input from a specimen to twice as large as before, and outputs the light having the converted numerical aperture. However, the present invention is not limited to the case.

Figure 2:
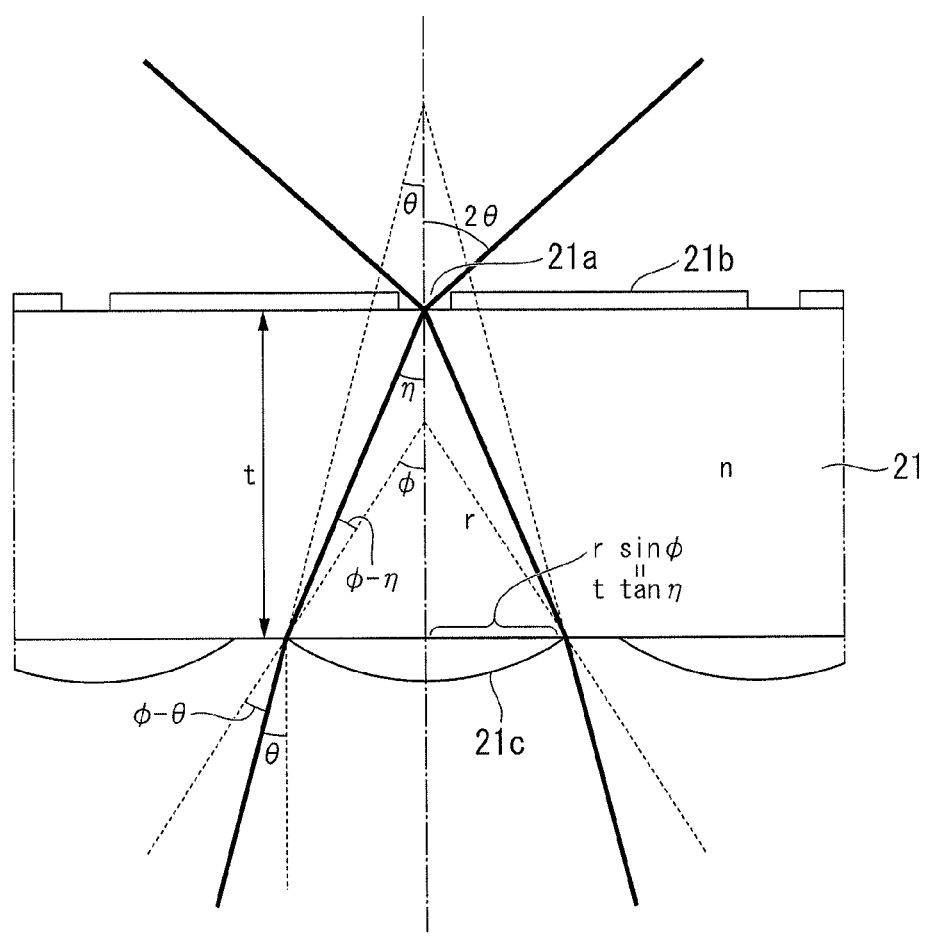
FIG. 2 is an enlarged diagram showing a part of pinhole disk with microlenses shown in FIG. 1.

The function of the pinhole disk with microlens 21 will be described in detail with reference to FIG. 2. FIG. 2 is an enlarged diagram particularly showing a pair of the pinhole 21a and the microlens 21c provided on the pinhole disk with microlens 21.

Considering a beam (thick line) input from the downside of FIG. 2, the beam is a convergent beam in the space where the beam exists before being input into the pinhole disk with microlens 21. The numerical aperture (NA) of the convergent beam is represented by $\sin(\theta)$. In other words, the beam has a slope of $\theta$ with respect to the light axis. The beam is refracted by the microlens 21c to be converted to the beam having the numerical aperture $n^*\sin(\eta)$. In other words, the beam has a slope of $\eta$ with respect to the light axis. Where, n is a refractive index of substrate of the pinhole disk with microlens 21. The radius of curvature r of the microlens 21c is decided so that the beam is a divergent beam where the numerical aperture is represented by $\sin(2\theta)$ in the space where the beam exists after being output from the pinhole 21a. In other words, the radius of curvature r is decided so that the beam has a slope of $2\theta$ with respect to the light axis.

The radius of curvature r of the microlens 21c, which meets the above-described condition, may be calculated as follows. When the thickness of the substrate of the pinhole disk with microlens 21 is defined as t and the half of the center angle of the microlens 21c is defined as $\Phi$, the relationship represented by the following equation (3) is satisfied based on the law of refraction with regard to the microlens 21c.

$$\sin(\phi-\theta)=n\sin(\phi-\eta) \quad (3)$$

In addition, the relationship represented by the following equation (4) is satisfied based on the law of refraction with regard to one surface where the pinholes 21a are provided.

$$\sin(2\theta)=n\sin(\eta) \quad (4)$$

In addition, the relationship represented by the following equation (5) is satisfied with regard to the distance from the beam to the light axis on the other surface where the microlenses 21c are provided.

$$r\sin(\phi)=t\tan(\eta) \quad (5)$$

Based on the equations (3) to (5), when the refractive index n and the thickness t of the substrate of the pinhole disk with microlens 21 and the incident angle $\theta$ of the beam are given, the radius of curvature r of the microlens 21c, which meets the above-described conditions, may be uniquely calculated. For example, when n=1.5, t=3.0 mm, and $\theta$=0.015 rad, the radius of curvature r is 2.0 mm.

The numerical aperture of the return light output from an objective lens 7 and input into the microlens 21c is equal to a value obtained by dividing the numerical aperture of the objective lens 7 by the magnification. Since the value is generally within a range of 0.01 to 0.05 rad, the approximation where $\sin(\theta)$ is nearly equal to $\theta$ is satisfied. In other words, the numerical aperture $\sin(\theta)$ in air is nearly equal to the angle $\theta$ with respect to the light axis. Therefore, it can be said that the pinhole disk with microlens 21 has a function to convert a beam input from one surface, on which the microlenses 21c are provided, into a beam having a numerical aperture, which is twice as large as that of the beam before being input into the pinhole disk with microlens 21 in the space where the beam output from the pinhole 21a exists, in other words, the pinhole disk with microlens 21 has a function to increase the numerical aperture. Conversely, it can be said that the pinhole disk with microlens 21 has a function to convert a beam input from the other surface, on which the pinholes 21a are provided, into a beam having a numerical aperture, which is the half of that before being input into the pinhole disk with microlens 21, in the space where the beam output from the microlens 21c exists, in other words, the pinhole disk with microlens 21 has a function to reduce the numerical aperture. Hereinbefore, the function of the pinhole disk with microlens 21 has been described in detail.

Again, referring to FIG. 1, the first embodiment will be described.

A light source device 5 includes a light source such as a laser and an optical system, which are not shown, and is configured to output collimated illumination light. The illumination light input into the confocal optical scanner 20 is divided into a plurality of illumination light beamlets by the plurality of microlenses 2a disposed on the microlens disk 2. The divided illumination light is transmitted through a beam splitter 6 and passes through the pinhole positioned opposite to the microlens 2a, through which the illumination light has been passed, among the plurality of pinholes 21a on the pinhole disk with microlens 21. In order to make the illumination light pass through each pinhole 21a effectively, each pinhole 21a is disposed on the focal plane of the microlens 2a. Then, the illumination light passes through the microlens 21c. At this time, as described above, the numerical aperture of each beamlet of the illumination light is reduced to half by the microlens 21c. The reduced numerical aperture of the beamlet may be close to or greater than a value obtained by dividing the numerical aperture of the objective lens 7 by the magnification.

The illumination light, which has passed through the pinhole disk with microlens 21, is condensed onto the specimen 8 by the objective lens 7. The specimen 8 outputs return light based on the illumination light. In particular, in a case of observation of a fluorescent specimen, the specimen 8 is stained using a fluorescent dye so as to have a specific structure. The fluorescent dye molecule is excited by the illumination light and the specimen 8 outputs fluorescence having a longer wavelength than the illumination light.

The return light captured by the objective lens 7 is condensed onto the pinhole disk with microlens 21 provided in the confocal optical scanner 20. Then, the numerical aperture of the return light is increased to twice as large as before by the microlens 21c, and the retune light passes through the pinhole 21a. At this time, only the return light from the focal plane of the objective lens 7 facing the specimen passes through the pinhole 21a. On the other hand, since return light from other than the focal plane is not focused on the pinhole 21a and is shielded by the light shielding mask 21b included in the pinhole disk with microlens 21, most of the return light cannot pass through the pinhole 21a.

The return light, which has passed through the pinhole 21a, is reflected by the beam splitter 6. In particular, in a case of fluorescent observation, the beam splitter 6 is for dispersing light based on a wavelength and has a short pass characteristic where illumination light is transmitted and return light, which is fluorescence and has a longer wavelength than the illumination light, is reflected. The return light reflected by the beam splitter 6 forms an image on a camera 10 by an imaging lens 9. At this time, the numerical aperture of the imaging lens 9 is increased to twice as large as before by the microlens 21c.

The converted numerical aperture may be close to or greater than the numerical aperture of the return light to form the image on the camera 10.

At the same time, the microlens disk 2 and the pinhole disk with microlens 21 are rotated by a motor 4, and the whole of specimen 8 is scanned using illumination light. This enables the super resolution confocal images of the specimen 8 to be imaged by the camera 10.

Figure 18:
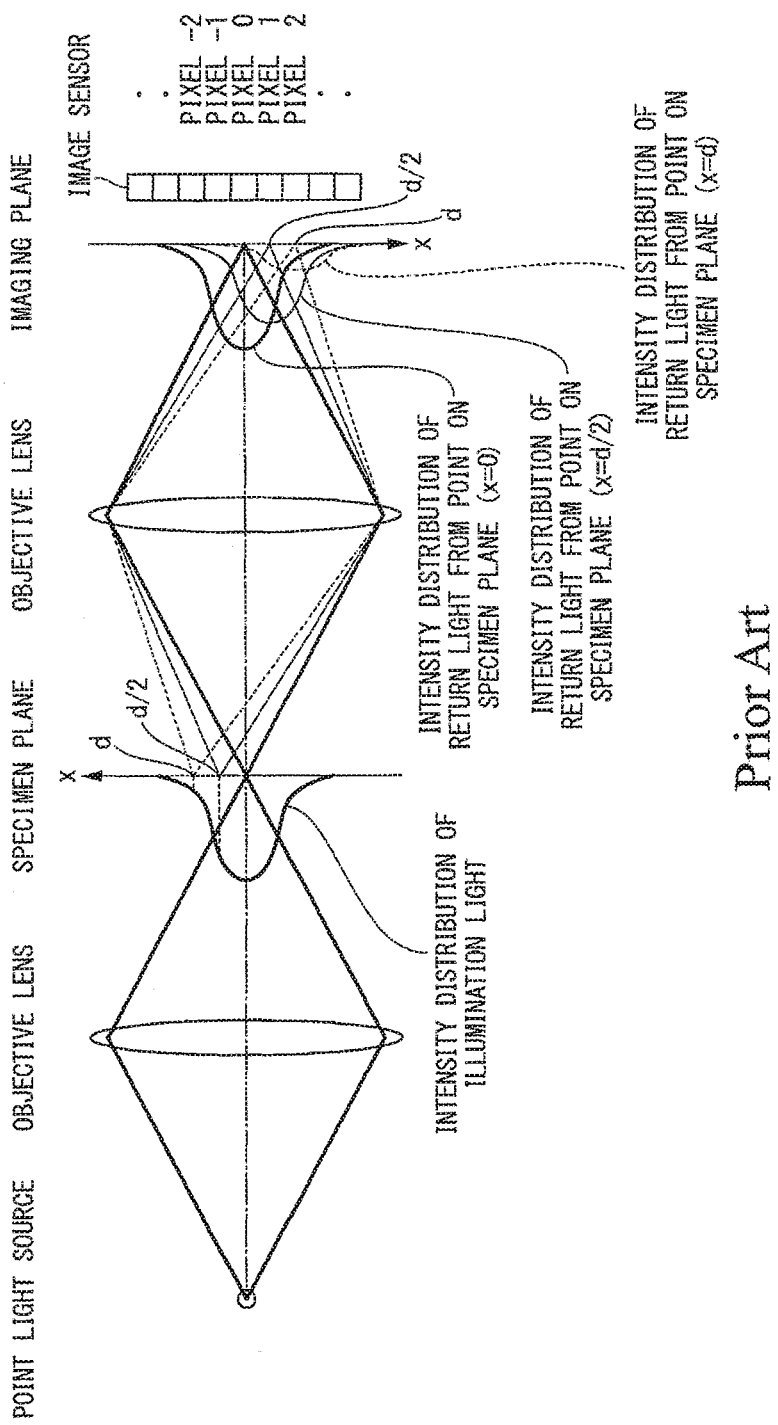
FIG. 18 is a diagram schematically showing a confocal optical system using a two-dimensional image sensor (camera).
Figure 19:
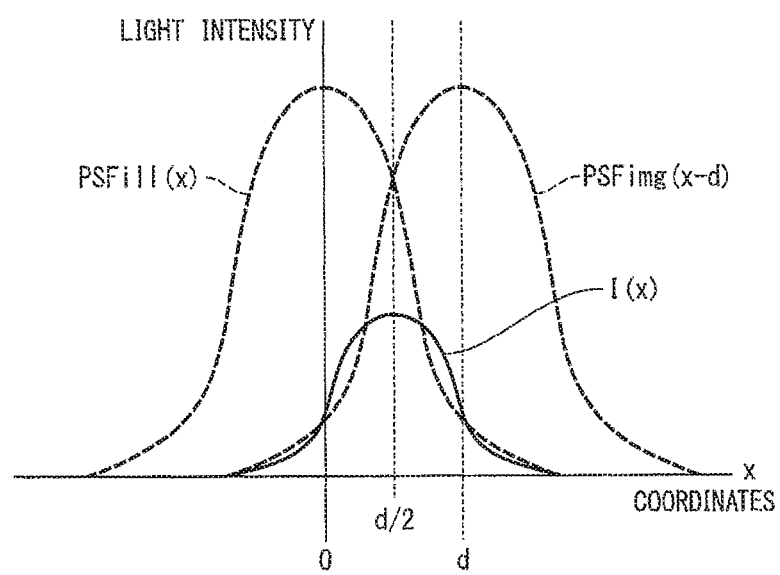
FIG. 19 is a diagram showing a point spread function PSF (x) in the confocal optical system shown in FIG. 18.
Figure 20:
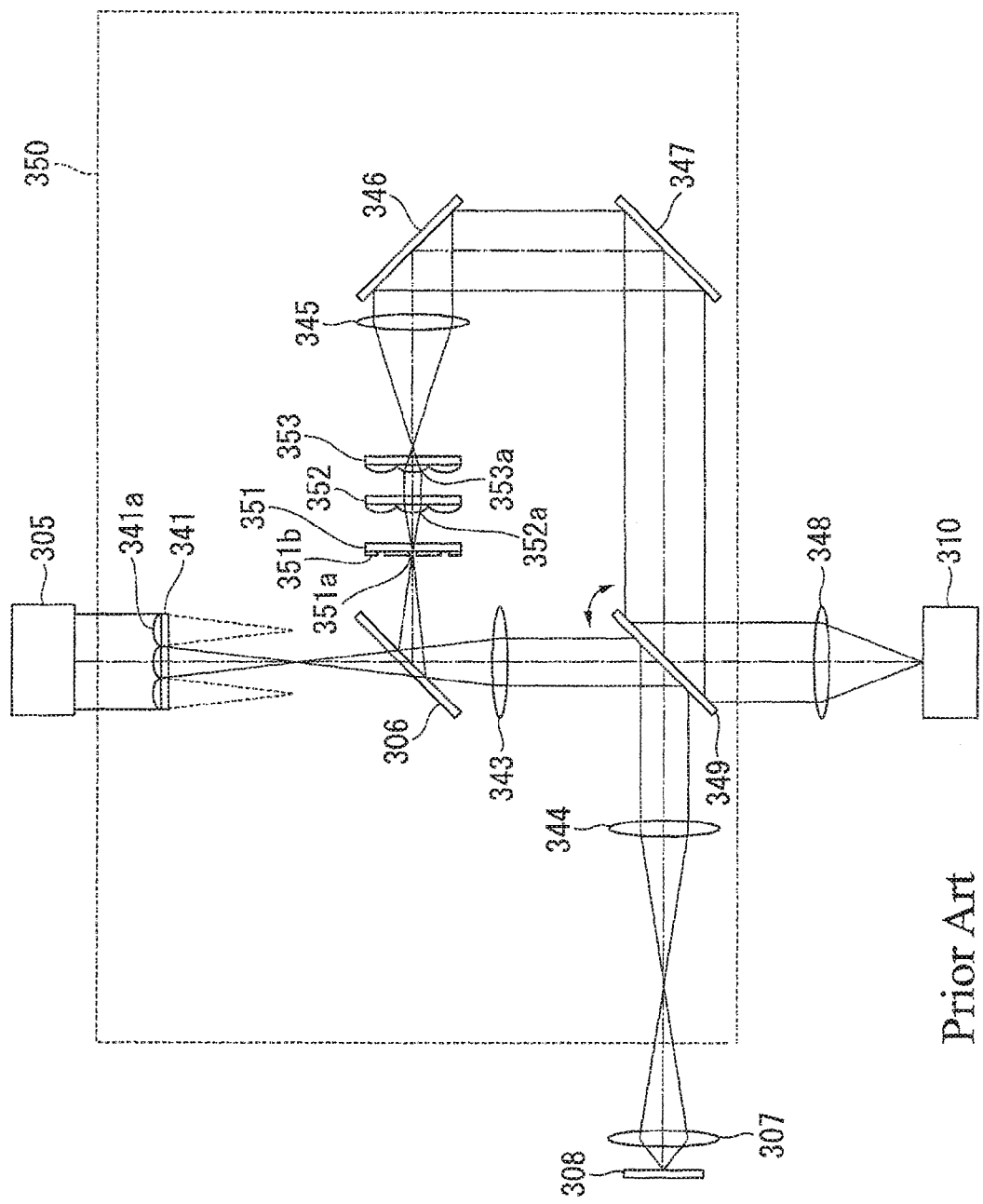
FIG. 20 is a diagram schematically showing another confocal optical scanner (Related Art 3) in the related art.

As described in "Related Art 2" with reference to FIGS. 18 and 19, in the confocal optical system using the two-dimensional image sensor (camera), the distribution of images on the specimen plane is increased to twice and projected on the imaging plane in the region of the Airy disc centered each bright point. Therefore, by reducing the distribution of images in the Airy disc to half and performing a correction process for conforming the coordinates on the specimen plane to the coordinates on the imaging plane, the high-frequency component beyond a resolution limit of optical system can be obtained.

On the other hand, in the first embodiment, the reduction of distribution of images in the Airy disc to half is optically performed. The reason is that, by increasing the numerical aperture of the return light from the objective lens 7 to twice as large as before by the pinhole disk with microlens 21, the width of the point spread function of the optical system is reduced to half in accordance with the equation (2), in other words, the distribution of images in the Airy disc, which has been reduced to half, is projected on the camera 10.

In addition, in "Related Art 2", it is necessary to image a few hundred non-scanning confocal images and to integrate them. On the other hand, according to the first embodiment, since the distribution of images in the Airy disc is optically reduced to half and the reduced distribution is projected on the camera 10, it is only necessary to perform one imaging during the scanning of the whole of specimen 8 using illumination light with rotating the motor 4. Thereby, super resolution images having a resolution, which is twice as large as the resolution limit (diffraction limit) of optical system, can be easily obtained in a quite short time.

In addition, in "Related Art 1", it is necessary to perform a high-frequency enhancement process for the imaged image. On the other hand, in the first embodiment, since the image imaged by the camera 10 is the super resolution image having the resolution, which is twice as large as the resolution limit (diffraction limit) of optical system, it is unnecessary to perform a high-frequency enhancement process for the imaged image. Therefore, there is no risk of the occurrence of various spurious resolution and artifacts due to noise components included in confocal images imaged by a camera. Therefore, it is unnecessary to determine parameters such as strength and a band in the high-frequency enhancement process by trial and error and there is no risk of confusion due to spurious resolution.

In addition, in the first embodiment, since the numerical aperture of the return light output from the objective lens 7 is optically increased to twice as large as before and the return light having the converted numerical aperture is imaged by the camera 10, the resolution is improved not only in the plane of the imaged image (x-y plane), but also in the light axial direction vertical to the image (z-axis direction). The reason is that the point spread function in the light axis direction is represented by the following (6) and the width of the point spread function in the light axis direction is inversely proportional to the square of the numerical aperture. Therefore, the first embodiment is suitable for a detailed observation of a three-dimensional structure of a specimen.

$$PSF_{axial}(z) = \left( \frac{\sin(\pi \cdot NA^2 \cdot z/(2\lambda))}{\pi \cdot NA^2 \cdot z/(2\lambda)} \right)^2 \qquad (6)$$

Since, in the pinhole disk with microlens 21 according to the first embodiment, the pinholes 21a and the microlenses 21c are formed on the single substrate, the mechanical adjustment between the pinholes 21a and the microlenses 21c is not required and the mechanical stability and the stability with respect to changings in environment such as temperature is quite high. In addition, the confocal optical scanner 20 has the configuration where the microlens disk 2 and the pinhole disk with microlens 21 are fixed coaxially with the motor 4, and the mechanical stability, the environmental stability with respect to temperature or the like, and the adjustability are high.

In addition, the device configuration according to the first embodiment is simple and inexpensive.

Second Embodiment

Next, a confocal optical scanner according to a second embodiment of the present invention will be described.

Figure 3:
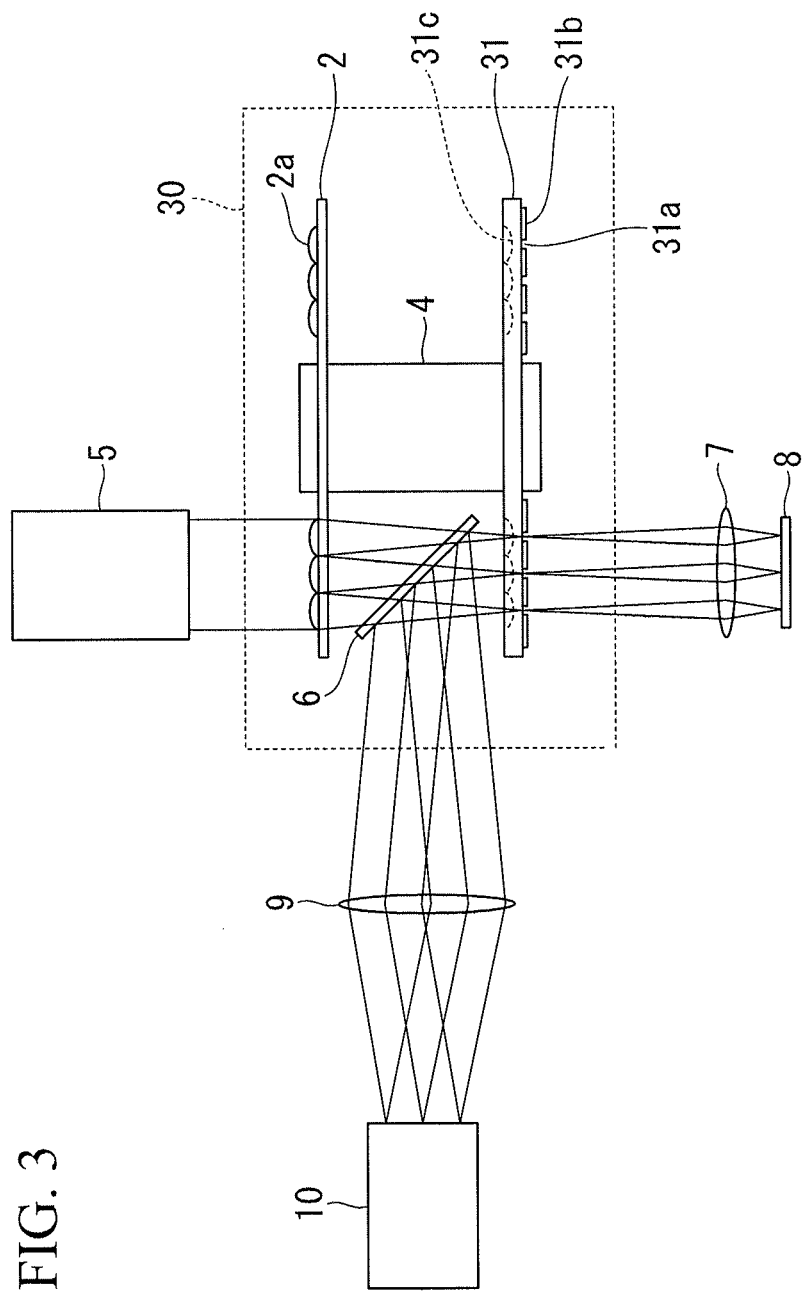
FIG. 3 is a diagram schematically showing another confocal optical scanner (second embodiment) according to the present invention.

FIG. 3 is a diagram schematically showing one configuration example of the confocal optical scanner according to the second embodiment.

In the second embodiment, different parts from those of the first embodiment will be mainly described. Parts that nearly correspond to those in the first embodiment are assigned the same reference numerals, and the detailed description for the parts will be omitted.

In the confocal optical scanner according to the second embodiment, a scanning device is a motor, an optical filter is a disk-shaped filter, and each microlens is a concave lens. The microlenses are disposed on one main surface of the optical filer, which is opposite to the other main surface facing the specimen.

The configuration and operation of a confocal optical scanner 30 according to the second embodiment will be described with reference to FIG. 3.

The confocal optical scanner 30 includes a microlens disk 2, on which a plurality of microlenses 2a is regularly disposed, a pinhole disk with micro concave lens 31 (optical filter), and a motor 4 (scanning device) for rotating the microlens disk 2 and the pinhole disk with micro concave lens 31. The pinhole disk with micro concave lens 31 includes micro concave lenses 31c, each of which is disposed on a position opposite to each microlens 2a of the microlens disk 2. In addition, the pinhole disk with micro concave lens 31 includes pinholes 31a. Each pinhole 31a is provided on the back side of the micro concave lens 31c. Each pinhole 31a is an opening of a light shielding mask 31b. Each microlens 2a and micro concave lens 31c may be another optical element, for example, a Fresnel lens and a diffractive-optical element, as long as the another optical element includes a lens effect.

Figure 4:
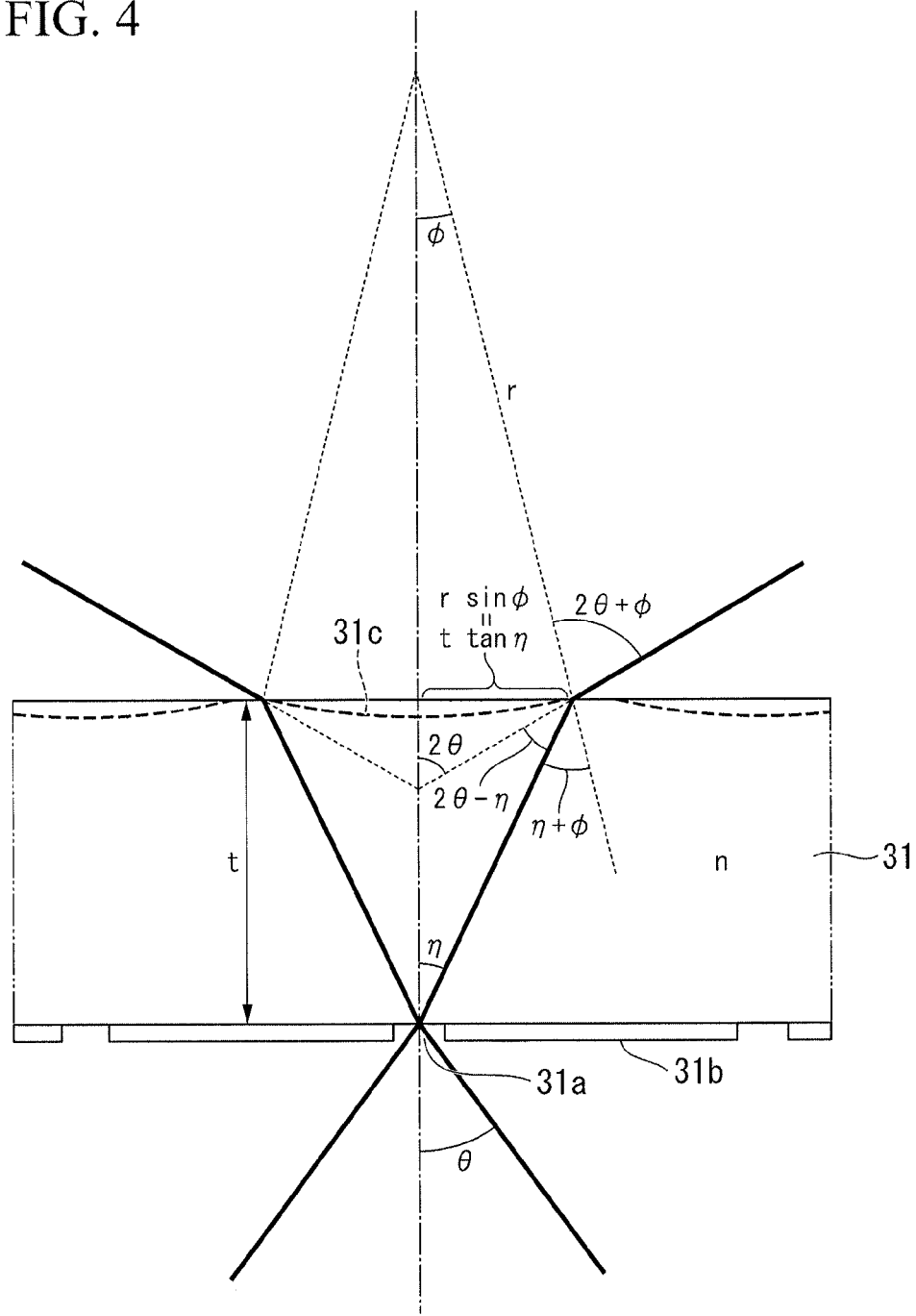
FIG. 4 is an enlarged diagram showing a part of pinhole disk with microlenses shown in FIG. 3.

The function of the pinhole disk with micro concave lens 31 will be described in detail with reference to FIG. 4. FIG. 4 is an enlarged diagram particularly showing a pair of the pinhole 31a and the micro concave lens 31c provided on the pinhole disk with micro concave lens 31.

Considering a beam (thick line) input from the downside of FIG. 4, the beam is a convergent beam and has a numerical aperture represented by $\sin(\theta)$ in the space where the beam exists before being input into the pinhole disk with micro concave lens 31. In other words, the beam has a slope of $\theta$ with respect to the light axis. The beam is refracted at the incident plane into the pinhole 31a to be converted to the beam having the numerical aperture $n*\sin(\eta)$. In other words, the beam has a slope of $\eta$ with respect to the light axis. Where, n is a refractive index of substrate of the pinhole disk with micro concave lens 31. The radius of curvature r of the micro concave lens 31c is decided so that the beam is a divergent beam where the numerical aperture is represented by $\sin(2\theta)$ in the space where the beam exists after being output from the micro concave lens 31c disposed on the other surface of the pinhole disk with micro concave lens 31. In other words, the radius of curvature r is decided so that the beam has a slope of $2\theta$ with respect to the light axis.

The radius of curvature r of the micro concave lens 31c, which meets the above-described conditions, may be calculated as follows.

When the thickness of the substrate of the pinhole disk with micro concave lens 31 is defined as t and the half of the center angle of the micro concave lens 31c is defined as $\Phi$, the relationship represented by the following equation (7) is satisfied based on the law of refraction with regard to the micro concave lens 31c.

$$\sin(2\theta+\phi)=n\sin(\eta+\phi) \qquad (7)$$

In addition, the relationship represented by the following equation (8) is satisfied based on the law of refraction with regard to one surface where the light shielding mask 31b is provided.

$$\sin(\theta)=n\sin(\eta) \qquad (8)$$

In addition, the relationship represented by the following equation (9) is satisfied with regard to the distance from the beam to the light axis at the other surface where the micro concave lenses 31c are provided.

$$r\sin(\phi)=t\tan(\eta) \qquad (9)$$

Based on the equations (7) to (9), when the refractive index n and the thickness t of the substrate of the pinhole disk with micro concave lens 31 and the incident angle $\theta$ of the beam are given, the radius of curvature r of the micro concave lens 31c, which meets the above-described conditions, may be uniquely calculated. For example, when n=1.5, t=3.0 mm, and $\theta$=0.015 rad, the radius of curvature r is 1.0 mm.

Therefore, it can be said that the pinhole disk with micro concave lens 31 has a function to convert a beam input from one surface, on which the pinholes 31a are provided, into a beam having a numerical aperture, which is twice as large as that of the beam before being input into the pinhole disk with micro concave lens 31, in the space where the beam output from the micro concave lens 31c exists. Conversely, it can be said that the pinhole disk with micro concave lens 31 has a function to convert a beam input from the other surface, on which the micro concave lenses 31c are provided, into a beam having a numerical aperture, which is the half of that before being input into the pinhole disk with micro concave lens 31, in the space where the beam output from the pinholes 31a exists. Hereinbefore, the function of the pinhole disk with micro concave lens 31 has been described in detail.

Again, referring to FIG. 3, the second embodiment will be described.

A light source device 5 includes a light source such as a laser and an optical system, which are not shown, and is configured to output collimated illumination light. The illumination light input into the confocal optical scanner 30 is divided into a plurality of illumination light beamlets by the plurality of microlenses 2a disposed on the microlens disk 2. The divided illumination light is transmitted through a beam splitter 6 and passes through the micro concave lens positioned opposite to the microlens 2a, through which the illumination light has been passed, among the plurality of micro concave lenses 31c on the pinhole disk with micro concave lens 31. At this time, as described above, the numerical aperture of each beamlet is reduced to half by the micro concave lens 31c. The reduced numerical aperture of the beamlet may be close to or greater than a value obtained by dividing the numerical aperture of the objective lens 7 by the magnification. Then, the illumination light passes through the pinhole 31a. In order to make the illumination light pass through each pinhole 31a effectively, each pinhole 31a is disposed on the focal plane of the microlens 2a.

The illumination light, which has passed through the pinhole disk with micro concave lens 31, is condensed onto the specimen 8 by the objective lens 7. The specimen 8 outputs return light based on the illumination light. In particular, in a case of observation of a fluorescent specimen, the specimen 8 is stained using a fluorescent dye or the like so as to have a specific structure. The fluorescent dye molecule is excited by the illumination light and the specimen 8 outputs fluorescence having a longer wavelength than the illumination light.

The return light captured by the objective lens 7 is condensed onto the pinhole disk with micro concave lens 31 provided in the confocal optical scanner 30. Then, the return light passes through the pinhole 31a, and the numerical aperture of the return light is increased to twice as large as before by the micro concave lens 31c. At this time, only the return light from the focal plane of the objective lens 7 facing the specimen passes through the pinhole 31a. On the other hand, since return light from other than the focal plane is not focused on the pinhole 31a and is shielded by the light shielding mask 31b included in the pinhole disk with micro concave lens 31, most of the return light cannot pass through the pinhole 31a.

The return light, which has passed through the pinhole disk with micro concave lens 31, is reflected by the beam splitter 6. In particular, in a case of fluorescent observation, the beam splitter 6 is for dispersing light based on a wavelength and has a short pass characteristic where illumination light is transmitted and return light, which is fluorescence and has a longer wavelength than the illumination light, is reflected. The return light reflected by the beam splitter 6 forms an image on a camera 10 by an imaging lens 9. At this time, the numerical aperture of the imaging lens 9 is increased to twice as large as before by the micro concave lens 31c. The converted numerical aperture may be close to or greater than the numerical aperture of the return light when the return light is imaged on the camera 10.

At the same time, the microlens disk 2 and the pinhole disk with micro concave lens 31 are rotated by the motor 4, and the whole of specimen 8 is scanned using illumination light. This enables the super resolution confocal images of the specimen 8 to be imaged by the camera 10.

As described above, also in the second embodiment, by increasing the numerical aperture of the return light from the objective lens 7 to twice as large as before by the pinhole disk with microlens, the width of the point spread function of the optical system is reduced to half, in other words, the distribution of images in the Airy disc, which has been reduced to half, is projected on the camera.

Thereby, in the confocal optical scanner according to the second embodiment, super resolution images where there are no spurious resolution and artifacts due to image processing can be obtained rapidly (in real time). The configuration of the confocal optical scanner is simple and inexpensive. The optical adjustment of the confocal optical scanner is easy and has high environmental stability.

Since such a confocal optical scanner has a super-resolution effect not only in an x-y plane of image, but also in an axial direction (z axis-direction), the confocal optical scanner is suitable for a fine observation of a three-dimensional structure of a specimen.

Third Embodiment

Next, a confocal optical scanner according to a third embodiment of the present invention will be described.

Figure 5:
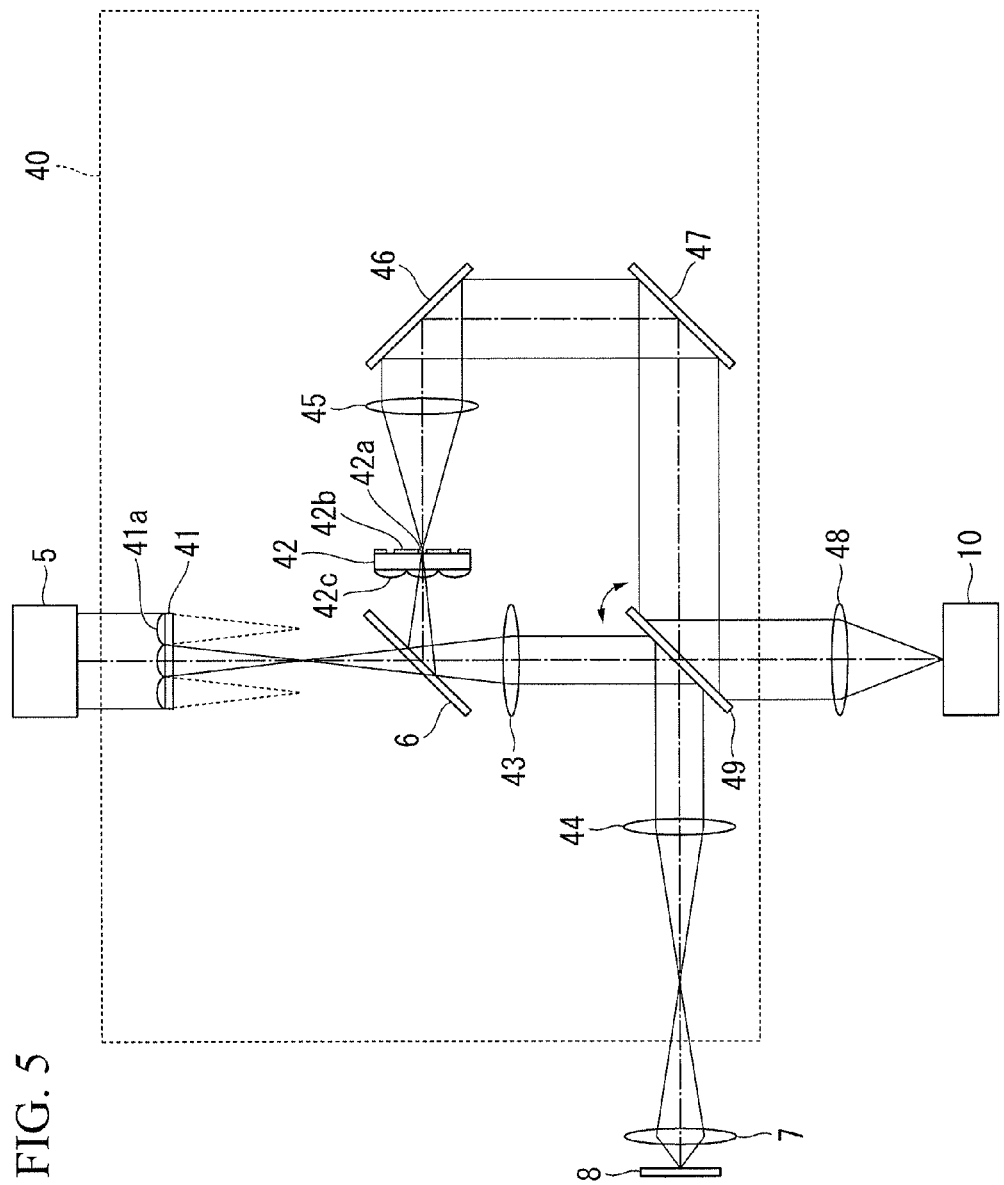
FIG. 5 is a diagram schematically showing another confocal optical scanner (third embodiment) according to the present invention.

FIG. 5 is a diagram schematically showing one configuration example of the confocal optical scanner according to the third embodiment.

In the third embodiment, different parts from those of the first and second embodiments will be mainly described. Parts that nearly correspond to those in the first and second embodiments are assigned the same reference numerals, and the detailed description for the parts will be omitted.

In the confocal optical scanner according to the third embodiment, a scanning device is a galvanic mirror, an optical filter is an array type filter, and each microlens is a convex lens. The microlenses are disposed on an incidence main surface of the optical filter.

The configuration and operation of a confocal optical scanner 40 according to the third embodiment will be described with reference to FIG. 5.

The confocal optical scanner 40 includes a microlens array 41, on which a plurality of microlenses 41a is regularly disposed, a pinhole array with microlenses 42 (optical filter), a galvanic mirror 49 (scanning device), a beam splitter 6, relay lenses 43, 44, and 45, and mirrors 46 and 47. The pinhole array with microlens 42 includes a plurality of pinholes 42a. Each pinhole 42a is disposed on a position, which optically corresponds to (is conjugate to) the focal position of each microlens 41a of the microlens array 41. Each pinhole 42a is an opening of a light shielding mask 42b. In addition, the pinhole array with microlens 42 includes a plurality of microlenses 42c. The microlenses 42c are disposed on one surface opposite to the other surface, on which the pinholes 42a are provided. The positions of microlenses 42c corresponds to those of the pinholes 42a, respectively. Each of the microlens 41a and the microlens 42c may be another optical element, for example, a Fresnel lens and a diffractive-optical element, as long as the another optical element includes a lens effect.

The pinhole array with microlens 42 converts a beam input from one surface, on which the microlenses 42c are provided, into a beam having a numerical aperture, which is twice as large as that of the beam before being input into the pinhole array with microlens 42, in the space where the beam output from the pinhole 42a exists. The pinhole array with microlens 42 according to the third embodiment does not have a scanning function with illumination light, and has only a function to filter return light from a specimen.

A light source device 5 includes a light source such as a laser and an optical system, which are not shown, and is configured to output collimated illumination light. The illumination light is divided into a plurality of illumination light beamlets by the microlens array 41. The microlens array 41 may be designed so that the numerical aperture of the illumination light beamlet is close to or greater than a value obtained by dividing the numerical aperture of an objective lens 7 by the magnification.

The illumination light passes through the beam splitter 6 and the relay lens 43, is reflected by the galvanic mirror 49, passes through the relay lens 44 and the objective lens 7, and is condensed onto a specimen 8. At this time, by varying the direction of the surface of the galvanic mirror 49, the whole of specimen 308 is scanned using the illumination light.

The specimen 8 outputs return light based on the illumination light. In particular, in a case of observation of a fluorescent specimen, the specimen 8 is stained using a fluorescent dye or the like so as to have a specific structure. The fluorescent dye molecule is excited by the illumination light and the specimen 8 outputs fluorescence having a longer wavelength than the illumination light.

The return light captured by the objective lens 7 passes through the relay lens 44, is reflected (descanned) by the galvanic mirror 49, passes through the relay lens 43, and is reflected by the beam splitter 6. In particular, in a case of fluorescent observation, the beam splitter 6 is for dispersing light based on a wavelength and has a short pass characteristic where illumination light is transmitted and return light, which is fluorescence and has a longer wavelength than the illumination light, is reflected.

The return light reflected by the beam splitter 6 is condensed onto the pinhole array with microlens 42. Then, the numerical aperture of the return light is increased to twice as large as before by the microlens 42c, and the return light passes through the pinhole 42a. At this time, only the return light from the focal plane of the objective lens 7 facing the specimen passes through the pinhole 42a. On the other hand, since return light from other than the focal plane is not focused on the pinhole 42a and is shielded by the light shielding mask 42b of the pinhole array with microlens 42, most of the return light cannot pass through the pinhole 42a.

The return light, which has passed through the pinhole array with microlens 42, passes through the relay lens 45, the mirror 46, and the mirror 47, is reflected (rescanned) by the galvanic mirror 49, and is imaged on the camera 10 by an imaging lens 48. The numerical aperture of each of the relay lens 45 and the imaging lens 48 may be close to or greater than that of the return light, which has been increased to twice as large as before by the microlens 42c.

In the pinhole array with microlens 42, the pinholes 42a may be provided on one side facing to the beam splitter 6 and the concave microlenses 42c may be provided on the other side facing to the relay lens 45.

According to the above-described configuration, since the numerical aperture of the return light, which has passed through the pinhole array with microlens 42, is increased to twice as large as the original numerical aperture, the distribution of images in the Airy disc is optically reduced to half and the reduced distribution is projected on the camera 10. Thereby, super resolution images having a resolution, which is twice as large as the resolution limit (diffraction limit) of optical system, can be obtained.

According to the above-described configuration, since only the return light passes through the pinhole array with microlens 42 and the illumination light does not pass through the pinhole array with microlens 42, the numerical aperture of illumination light is not reduced to half by the pinhole array with microlens 42. Therefore, the design condition where the numerical aperture of the microlens 41a is set to be close to or greater than a value obtained by dividing the numerical aperture of the objective lens 7 by the magnification can be easily satisfied.

In addition, since, in the pinhole array with microlens 42 according to the third embodiment, the pinholes 42a and the microlenses 42c are formed on the single substrate, the mechanical adjustment between the pinholes 42a and the microlenses 42c is not required and the mechanical stability, the stability with respect to changings in environment such as temperature, and the adjustability are quite high.

In the third embodiment, a description will be provided for the case in which the microlens is a convex lens. However, the present invention is not limited to the configuration. The microlens may be a concave lens. In this case, the microlenses are disposed on a light emitting main surface of the optical filter.

Fourth Embodiment

Next, a confocal optical scanner according to a fourth embodiment of the present invention will be described.

Figure 6:
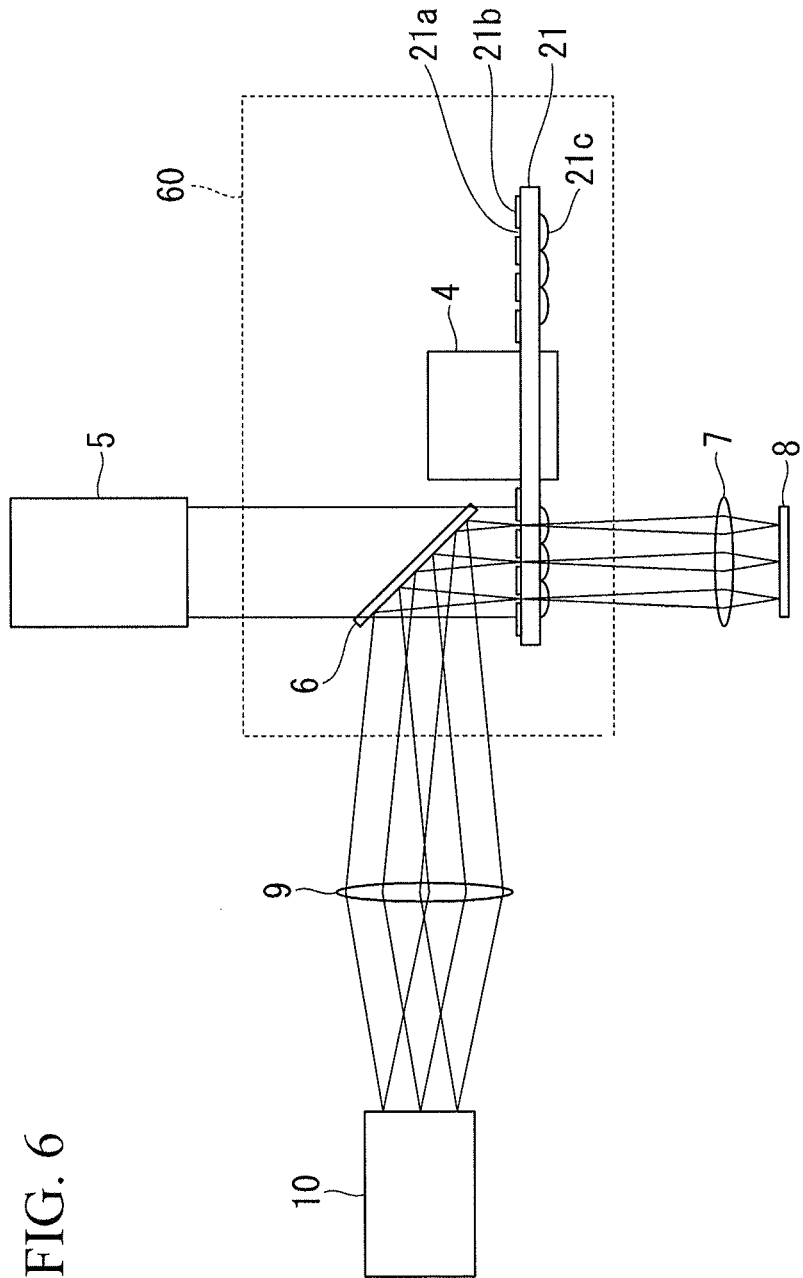
FIG. 6 is a diagram schematically showing another confocal optical scanner (fourth embodiment) according to the present invention.

FIG. 6 is a diagram schematically showing one configuration example of the confocal optical scanner according to the fourth embodiment.

In the fourth embodiment, different parts from those of the first to third embodiments will be mainly described. Parts that nearly correspond to those in the first to third embodiments are assigned the same reference numerals, and the detailed description for the parts will be omitted.

As shown in FIG. 6, a confocal optical scanner 60 according to the fourth embodiment has a configuration that the microlens disk 2 is omitted from the confocal optical scanner 20 according to the first embodiment.

Also, in the confocal optical scanner according to the fourth embodiment, by increasing a numerical aperture of return light from an objective lens 7 to twice as large as before by a pinhole disk with microlens, a width of a point spread function of an optical system is reduced to half, in other words, the distribution of images in an Airy disc, which has been reduced to half, is projected on a camera.

Thereby, in the confocal optical scanner according to the fourth embodiment, super resolution images where there are no spurious resolution and artifacts due to image processing can be obtained rapidly (in real time). The configuration of the confocal optical scanner is simple and inexpensive. The optical adjustment of the confocal optical scanner is easy and has high environmental stability.

Since such a confocal optical scanner has a super-resolution effect not only in an x-y plane of image, but also in an axial direction (z axis-direction), the confocal optical scanner is suitable for a fine observation of a three-dimensional structure of a specimen.

In particular, since the configuration according to the fourth embodiment does not include a microlens disk, the configuration is simple and inexpensive.

Fifth Embodiment

Next, a confocal optical scanner according to a fifth embodiment of the present invention will be described.

Figure 7:
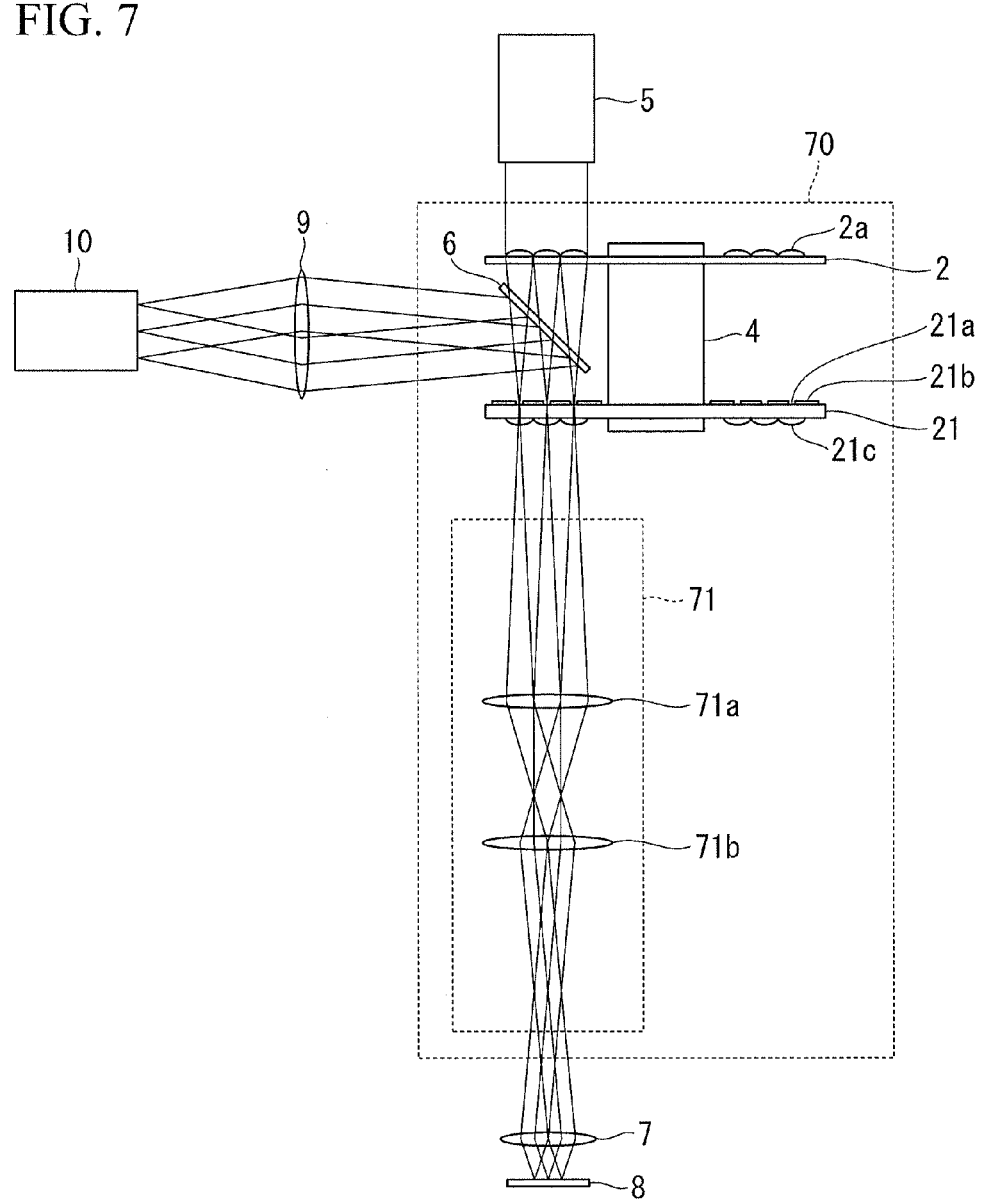
FIG. 7 is a diagram schematically showing another confocal optical scanner (fifth embodiment) according to the present invention.
Figure 8:
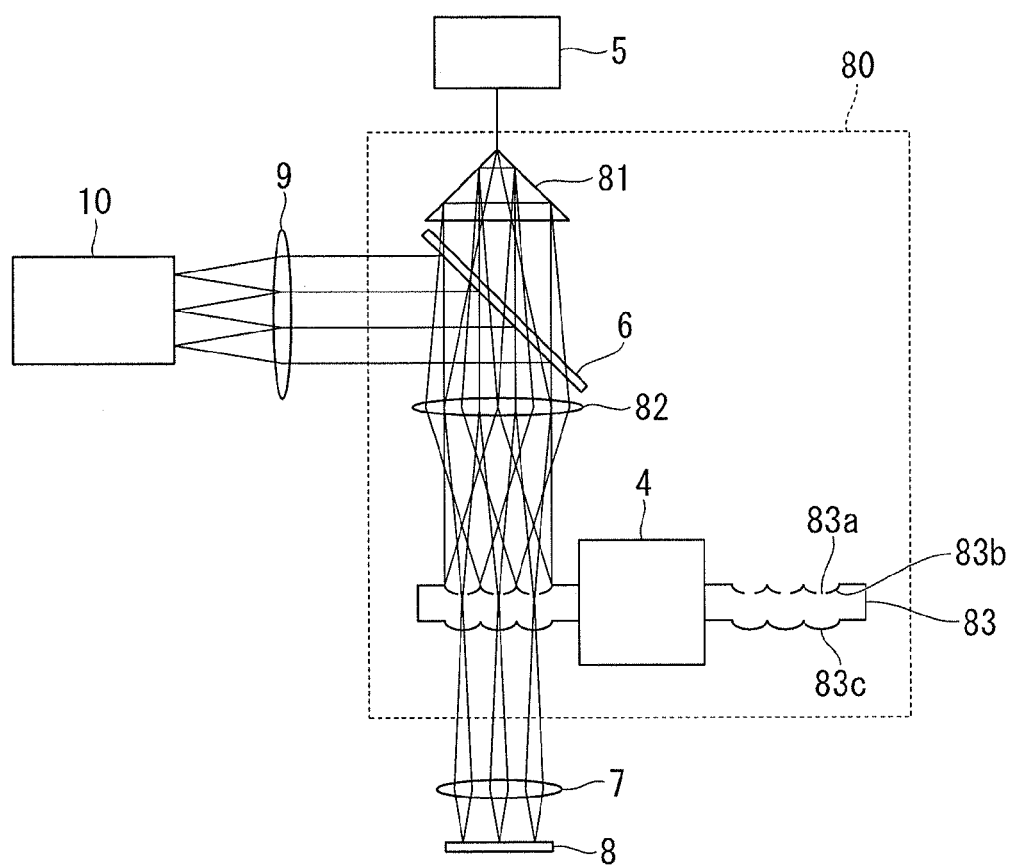
FIG. 8 is a diagram schematically showing another confocal optical scanner (sixth embodiment) according to the present invention.

FIG. 7 is a diagram schematically showing one configuration example of the confocal optical scanner according to the fifth embodiment.

In the fifth embodiment, different parts from those of the first to fourth embodiments will be mainly described. Parts that nearly correspond to those in the first to fourth embodiments are assigned the same reference numerals, and the detailed description for the parts will be omitted.

The confocal optical scanner according to the fifth embodiment includes an optical filter, a scanning device, and an intermediate variable magnification optical system.

The configuration and operation of a confocal optical scanner 70 according to the fifth embodiment will be described with reference to FIG. 7.

The confocal optical scanner 70 includes, in addition to the components in the first embodiment, an intermediate variable magnification optical system 71. The intermediate variable magnification optical system 71 includes a lens 71a and a lens 71b. The ratio of the focal length of the lens 71a to that of the lens 71b is 2:1. The intermediate variable magnification optical system 71 has magnifications of two times. The magnifications and optical system configuration of the intermediate variable magnification optical system 71 are not limited to those described above. For example, a variable magnification zoom optical system may be adopted.

The intermediate variable magnification optical system 71 increases a numerical aperture of a beam input from the lens 71a to twice as large as that of the beam before being input into the intermediate variable magnification optical system 71 in the space where the beam output from the lens 71b exists, in other words, the intermediate variable magnification optical system 71 increases the numerical aperture. Conversely, the intermediate variable magnification optical system 71 reduces a numerical aperture of a beam input from the lens 71b to half of that before being input into the intermediate variable magnification optical system 71 in the space where the beam output from the lens 71a exists, in other words, the intermediate variable magnification optical system 71 reduces the numerical aperture.

Therefore, the numerical aperture of the illumination light, which has been output from the microlens 2a, is reduced to half by the microlens 21c. However, then, the illumination light, which has been output from the microlens 21c, is increased to twice as large as before by the intermediate variable magnification optical system 71, and the converted light is input into the objective lens 7. Therefore, the conversion magnification of the numerical aperture of the illumination light is 1× in total.

Regarding to the numerical aperture of the microlens 2a, there are some cases where the design condition where the numerical aperture of the illumination light at the time of the input of the illumination light into the objective lens 7 is close to or greater than a value obtained by dividing the numerical aperture of the objective lens 7 by the magnification is required to be satisfied. According to the above-described configuration, the numerical aperture of the microlens 2a is equal to that of the illumination light at the time of being input into the objective lens 7. Therefore, even if the numerical aperture of the microlens 2a is set to be half of that in the case where the confocal optical scanner 70 does not include the intermediate variable magnification optical system 71, the above-described design condition can be satisfied. Generally, when the numerical aperture of the microlens is small, the microlens can be manufactured inexpensively.

Next, considering the return light output from the objective lens 7, the numerical aperture of the return light is reduced to half by the intermediate variable magnification optical system 71 and then is increased to twice as large as before by the microlens 21c. Therefore, the conversion magnification of the numerical aperture of the return light is 1× in total.

Regarding to the numerical aperture of the imaging lens 9, there are some cases where the design condition where the numerical aperture of the imaging lens 9 is close to or greater than the numerical aperture of the return light when the numerical aperture of the return light is increased to twice as large as before by the microlens 21c and is imaged by the camera 10 is required to be satisfied. According to the above-described configuration, the numerical aperture of the return light output from the objective lens 7 is equal to that of the return light on the imaging lens 9. Therefore, even if the numerical aperture of the imaging lens 9 is set to be half of that in the case where the confocal optical scanner 70 does not include the intermediate variable magnification optical system 71, the above-described design conditions can be satisfied. Generally, when the numerical aperture of the imaging lens is small, the imaging lens can be manufactured inexpensively.

The magnifications of the intermediate variable magnification optical system 71 are not limited to two times. For example, considering a case where the magnifications of the intermediate variable magnification optical system 71 are set to three times, even if the numerical apertures of the microlens 2a and the imaging lens 9 are more reduced, the above-described design conditions can be satisfied. Since the size of observation visual field is inversely proportional to the magnifications of the intermediate variable magnification optical system 71, the magnifications of the intermediate variable magnification optical system may be decided in consideration of these conditions.

According to the above-described configuration, the numerical apertures of the microlens 2a and the imaging lens 9 can be reduced, and an inexpensive confocal optical scanner can be provided.

Sixth Embodiment

Next, a confocal optical scanner according to a sixth embodiment of the present invention will be described.

Each of FIGS. 8 to 15 is a diagram schematically showing one configuration example of the confocal optical scanner according to the sixth embodiment.

In the sixth embodiment, different parts from those of the first to fifth embodiments will be mainly described. Parts that nearly correspond to those in the first to fifth embodiments are assigned the same reference numerals, and the detailed description for the parts will be omitted.

In the confocal optical scanner according to the sixth embodiment, a scanning device is a motor and an optical filter includes a disk-shaped body. Convex microlenses are provided on one main surface of the body facing a specimen. Each pinhole is disposed on the center of concave micro mirror provided on the other main surface of the body opposite to the one main surface. In other words, each pinhole is formed in a reflective film which acts as a micro mirror in the sixth embodiment.

The configuration and operation of a confocal optical scanner according to the sixth embodiment will be described with reference to FIGS. 8 to 15.

Figure 13:
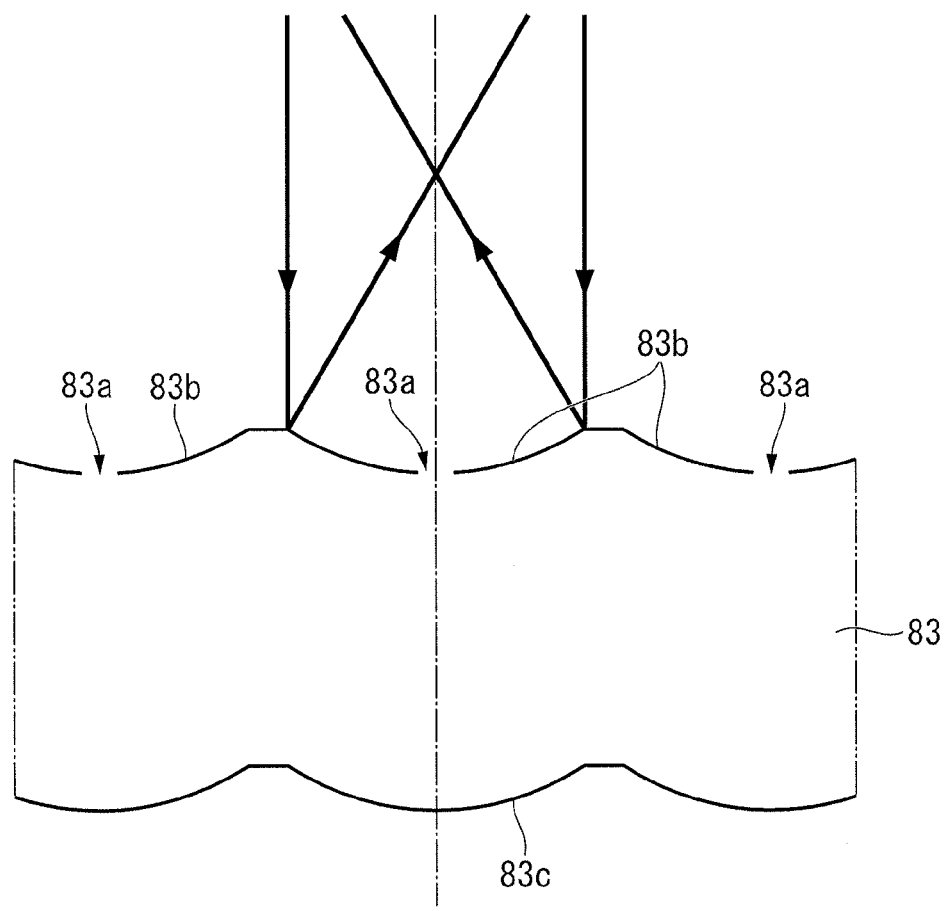
FIG. 13 is an enlarged diagram showing a part of scandisk shown in FIG. 10.

A confocal optical scanner 80 includes a corner cube 81, a beam splitter 6, and a lens 82, a scan disk 83, a motor 4. As shown in FIG. 13, a plurality of micro concave mirrors 83b is regularly provided on one surface of the scan disk 83 facing the corner cube 81. A pinhole 83a, which is a small opening, is formed on the center of each micro concave mirror 83b. Light is transmitted through the pinhole 83a. Micro lenses 83c are provided on the other surface of the scan disk 83 opposite to the one surface. The micro lenses 83c are disposed opposite to the micro concave mirror 83b, respectively. Each microlens 83c may be another optical element, for example, a Fresnel lens and a diffractive-optical element as long as the another optical element includes a lens effect. The scan disk 83 is fixed to the rotation axis of the motor 4.

Figure 14:
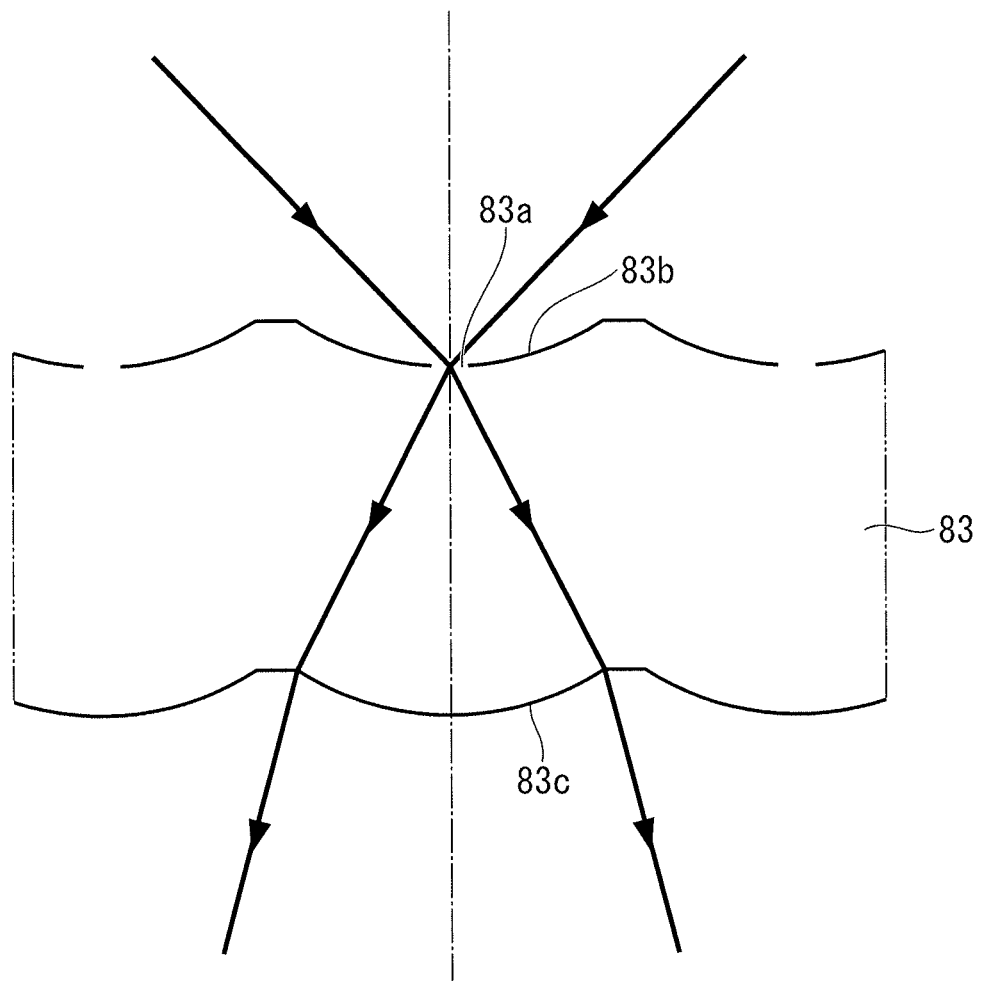
FIG. 14 is an enlarged diagram showing a part of scandisk shown in FIG. 10.
Figure 15:
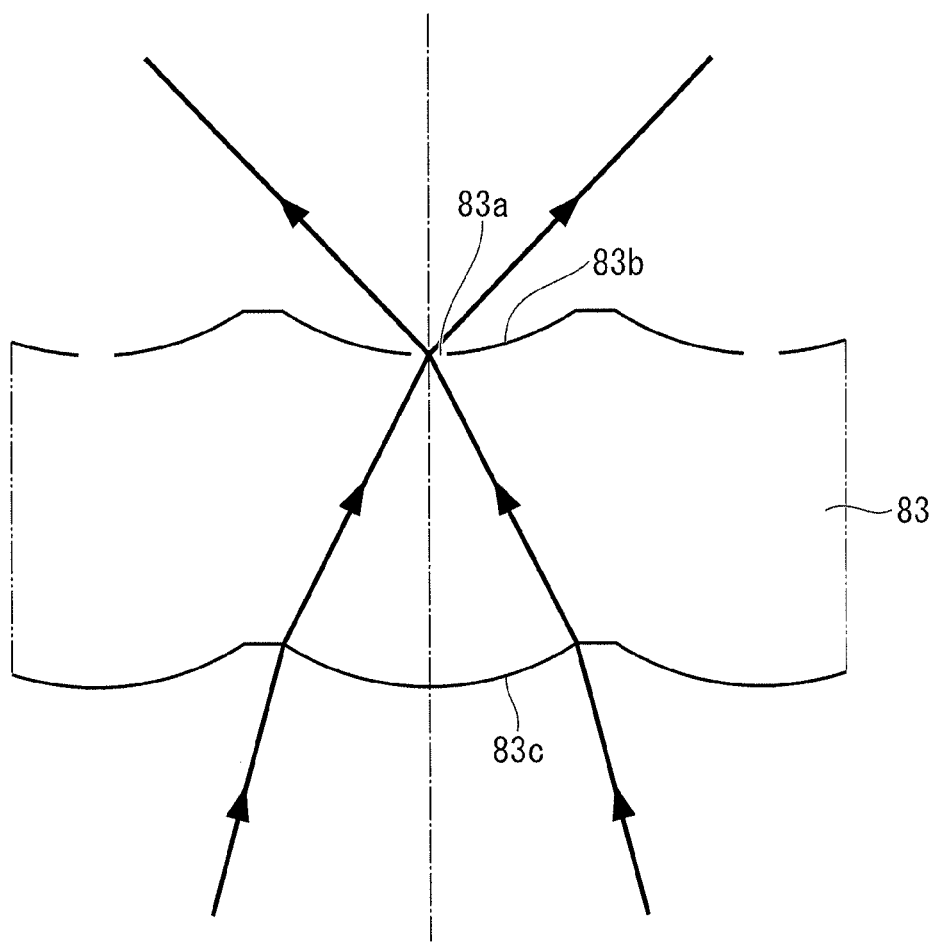
FIG. 15 is an enlarged diagram showing a part of scandisk shown in FIG. 10.
Figure 16:
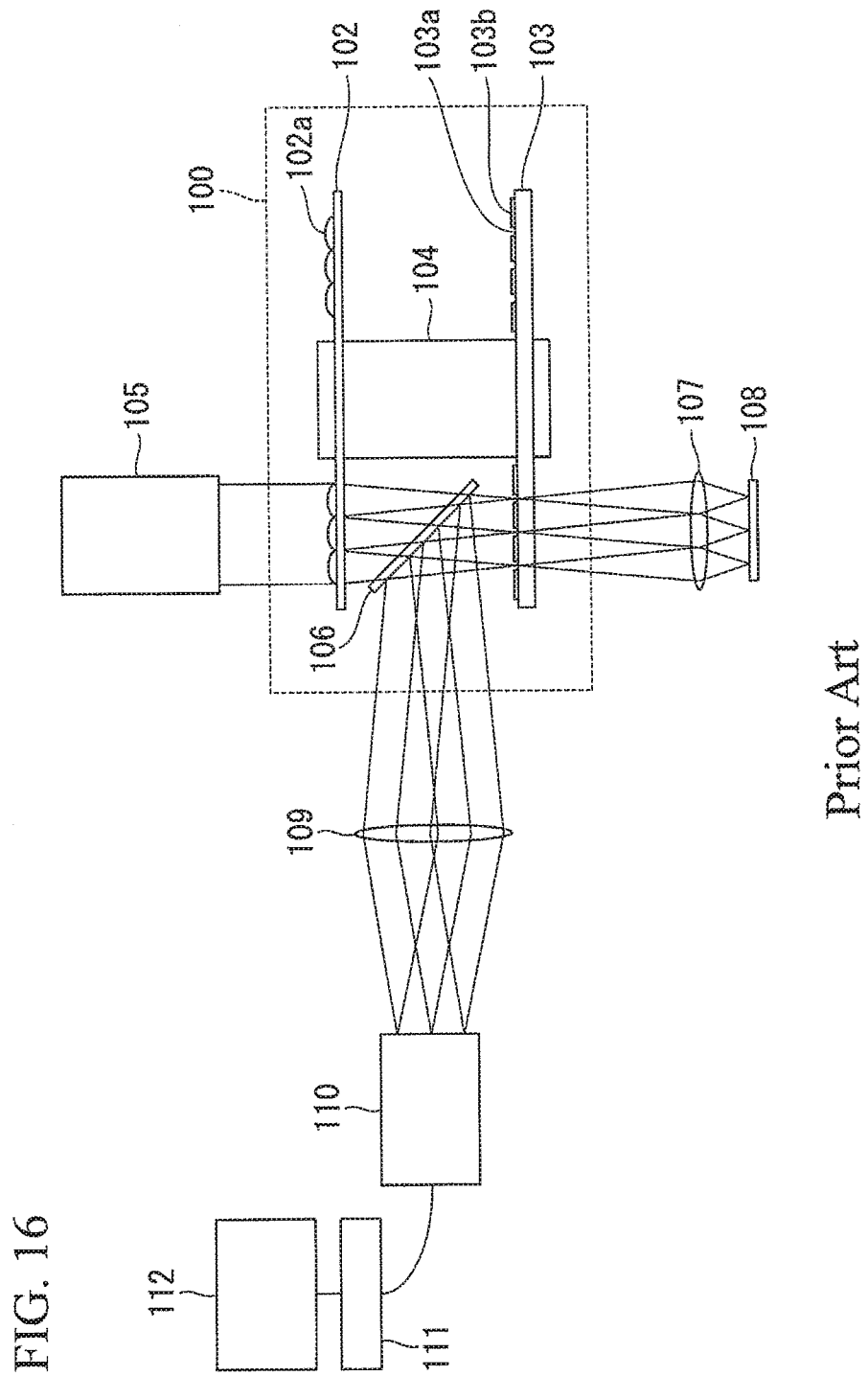
FIG. 16 is a diagram schematically showing one confocal optical scanner (Related Art 1) in the related art.
Figure 17:
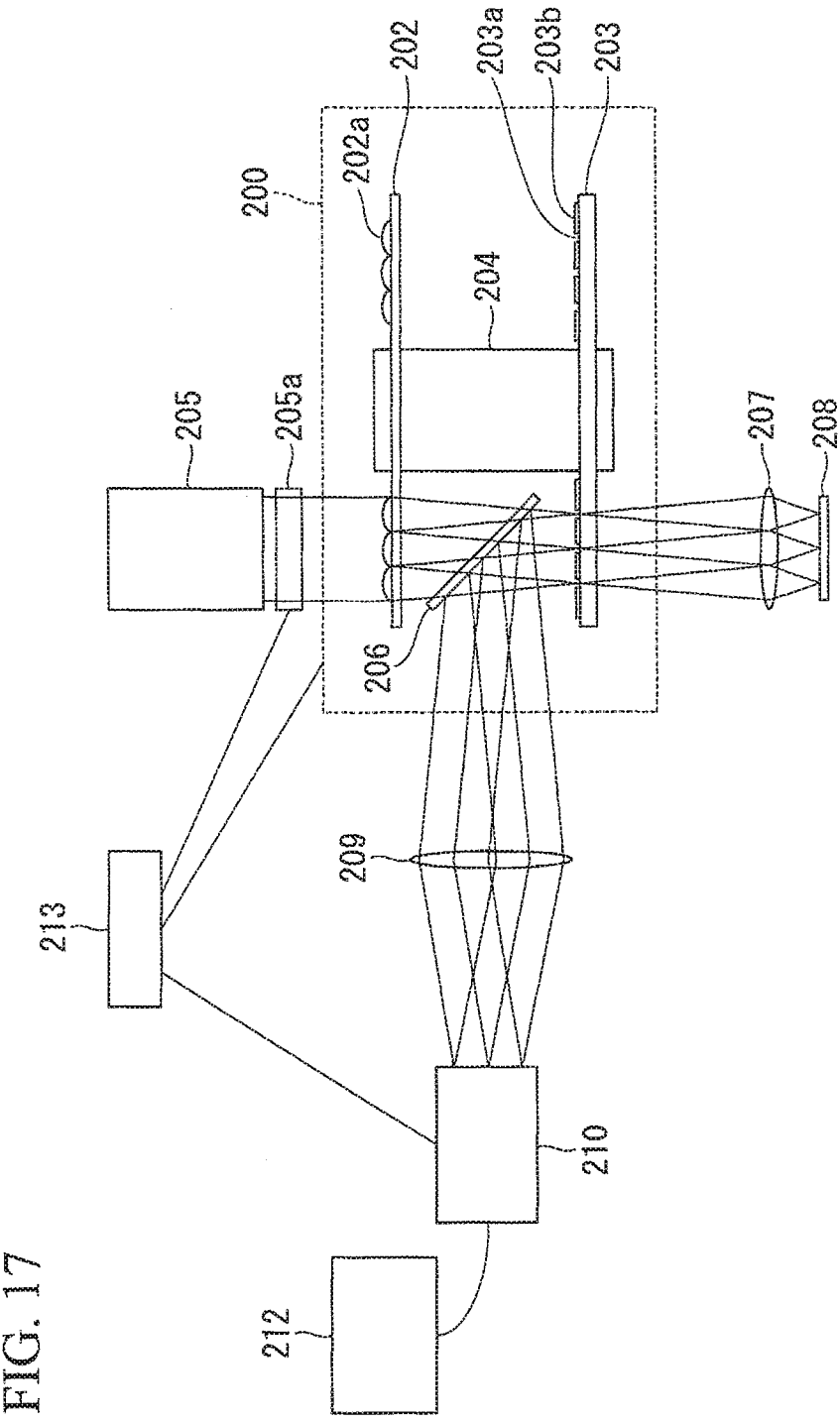
FIG. 17 is a diagram schematically showing another confocal optical scanner (Related Art 2) in the related art.

The function of the scan disk will be described in detail with reference to FIGS. 13 to 15. As shown in FIG. 13 in detail, the micro concave mirror 83b is a concave mirror for reflecting a parallel beam input from one side facing the lens 82 and converting the parallel beam to convergent beam. The micro concave mirror 83b does not reflect light input into the pinhole 83a and makes the light be transmitted. In addition, as shown in FIG. 14 in detail, the micro concave mirror 83b converts the beam, which has been collected to the pinhole 83a from the one side facing the lens 82 and input into the scan disk 83, so that the converted beam has a numerical aperture, which is half of that before being input into the scan disk 83, in the space where the beam output from the microlens 83c exists. Conversely, as shown in FIG. 15 in detail, the microlens 83c converts the beam, which has been input into the scan disk 83 from the other side facing the objective lens 7, so that the converted beam has a numerical aperture, which is twice as large as that of the beam before being input into the scan disk 83, in the space where the beam output from the pinhole 83a exists.

Figure 9:
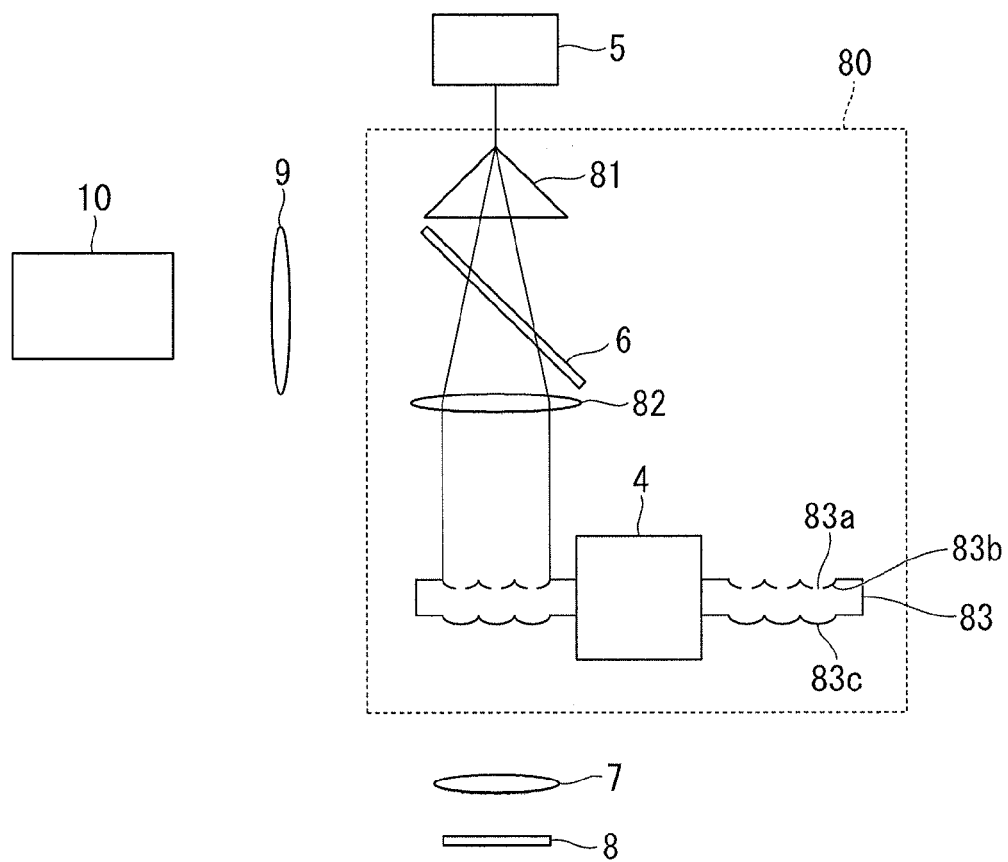
FIG. 9 is a diagram schematically showing one variation of the confocal optical scanner (sixth embodiment) shown in FIG. 8.
Figure 10:
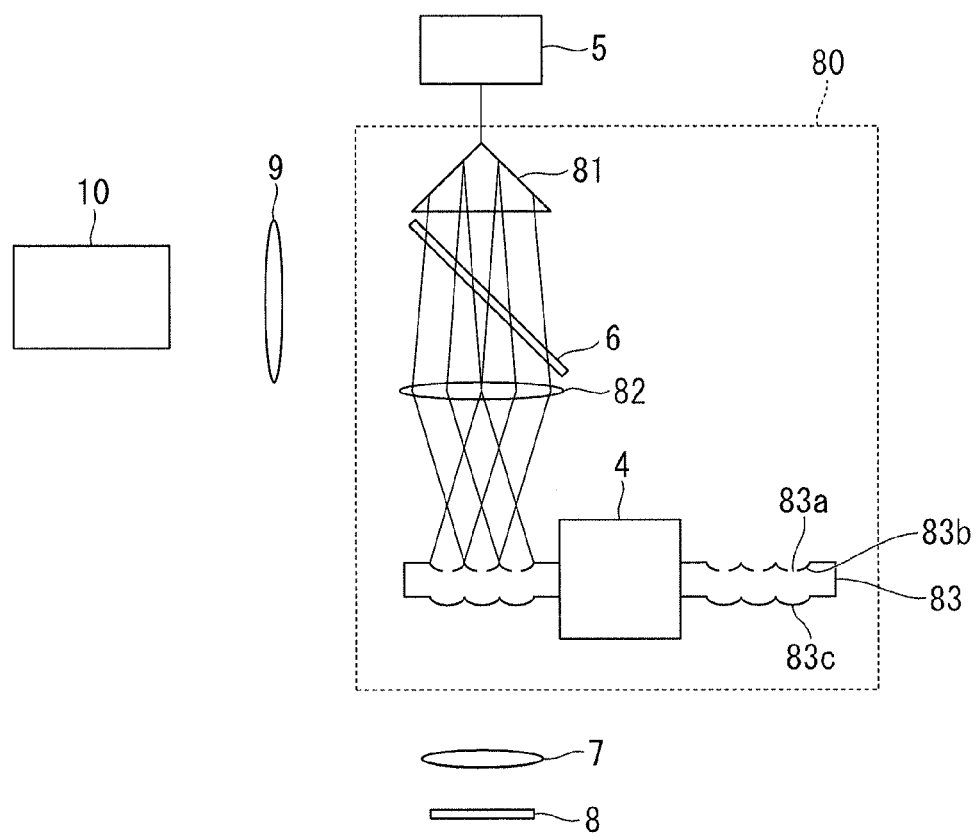
FIG. 10 is a diagram schematically showing another variation of the confocal optical scanner (sixth embodiment) shown in FIG. 8.

A light source device 5 includes a light source such as a laser, which is not shown, and enters illumination light into the corner cube 81 by an optical fiber or the like. The illumination light output from the corner cube 81 passes through the beam splitter 82, is converted to parallel light by the lens 82, and is input into the micro concave mirror 83b of the scan disk 83 (FIG. 9). The illumination light is divided into a plurality of illumination light beamlets and reflected by the micro concave mirror 83b. The illumination light, which has been reflected by the micro concave mirror 83b, passes through the lens 82 and the beam splitter 6, and is input into the corner cube 81 (FIG. 10).

Figure 11:
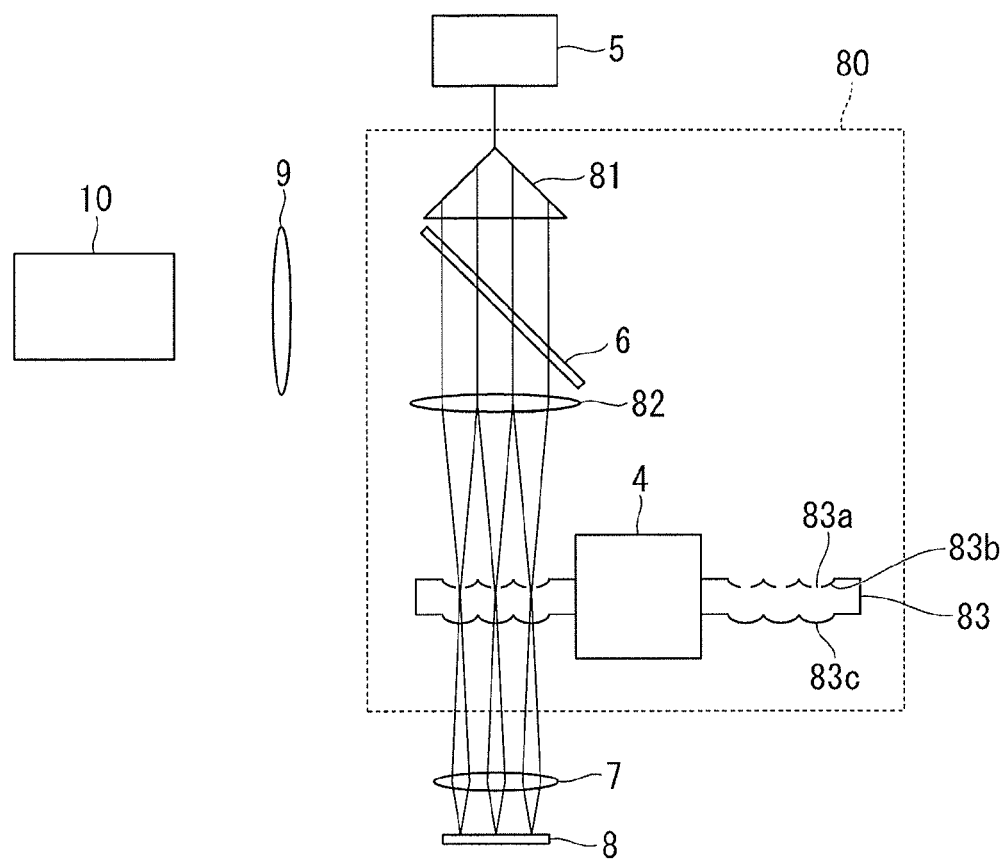
FIG. 11 is a diagram schematically showing another variation of the confocal optical scanner (sixth embodiment) shown in FIG. 8.

The illumination light is reflected inside the corner cube 81, is output from the corner cube 81, passes through the beam splitter 6 and the lens 82, and is condensed onto the pinhole 83a of the scan disk 83. The illumination light, which has been input from the pinhole 83a and into the scan disk 83, is converted to a light having a numerical aperture, which is half of that before being input into the scan disk 83, by the microlens 83c. The converted light is output from the scan disk 83, and is condensed onto a specimen 8 by the objective lens 7 (FIG. 11). The micro concave mirror 83b is configured to focus the illumination light onto the pinhole 83a and to make the numerical aperture of the illumination light output from the microlens 83c be close to or greater than a value obtained by dividing the numerical aperture of the objective lens 7 by the magnification.

The specimen 8 outputs return light based on the illumination light. In particular, in a case of observation of a fluorescent specimen, the specimen 8 is stained using a fluorescent dye or the like so as to have a specific structure. The fluorescent dye molecule is excited by the illumination light and the specimen 8 outputs fluorescence having a longer wavelength than the illumination light.

The return light captured by the objective lens 7 is condensed onto the scan disk 83. Then, the numerical aperture of the return light is increased to twice as large as before by the microlens 83c, and is output from the pinhole 83a. At this time, only the return light from the focal plane of the objective lens 7 facing the specimen passes through the pinhole 83a. On the other hand, since return light from other than the focal plane is not focused onto the pinhole 83a, most of the return light cannot pass through the pinhole 83a.

The return light, which has passed through the pinhole 83a, passes through the lens 82, and is reflected by the beam splitter 6.

Figure 12:
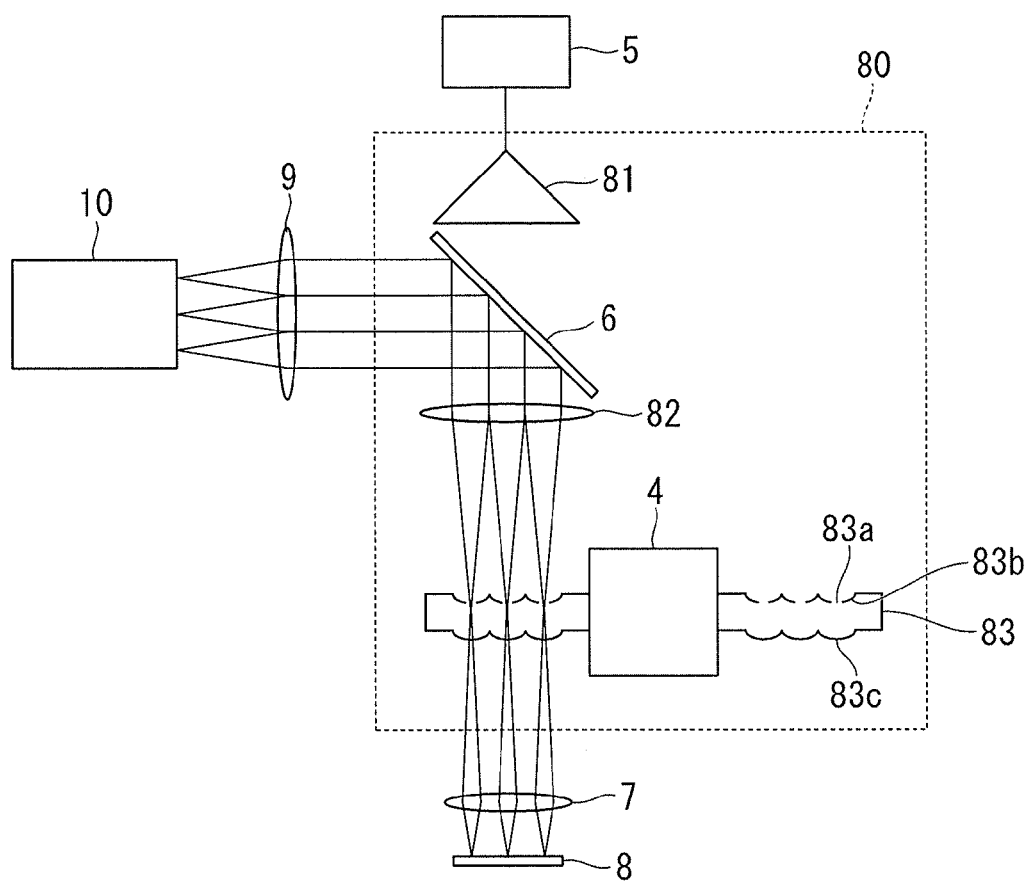
FIG. 12 is a diagram schematically showing another variation of the confocal optical scanner (sixth embodiment) shown in FIG. 8.

In particular, in a case of fluorescent observation, the beam splitter 6 is for dispersing light based on a wavelength and has a short pass characteristic where illumination light is transmitted and return light, which is fluorescence and has a longer wavelength than the illumination light, is reflected. The return light reflected by the beam splitter 6 is imaged on the camera 10 by the imaging lens 9 (FIG. 12). The numerical apertures of the lens 82 and the imaging lens 9 may be close to that of the return light output from the pinhole 83a.

At the same time, the specimen 8 is scanned with the illumination light with rotating the scan disk 83 by the motor 4. This enables the super resolution confocal images of the specimen 8 to be imaged by the camera 10.

According to the above-described configuration, since the numerical aperture of the return light, which has been output from the pinhole 83a of the scan disk 83, is increased to twice as large as that of the light before being input into the microlens 83c, the distribution of images in the Airy disc is optically reduced to half and the reduced distribution is projected on the camera 10. Therefore, super resolution images having a resolution, which is twice as large as the resolution limit (diffraction limit) of optical system, can be obtained.

In addition, according to the above-described configuration, since the pinholes 83a, the micro concave mirrors 83b, and the microlenses 83c are formed on the single scan disk 83, the mechanical adjustment among the pinholes 83a, the micro concave mirrors 83b, and the microlenses 83c is not required and the mechanical stability and the stability with respect to changings in environment such as temperature are quite high.

According to the confocal optical scanners of the first to sixth embodiments as described above, by increasing a numerical aperture of return light from an objective lens to, for example, to twice as large as before by a pinhole disk with microlens, a width of a point spread function of an optical system is reduced to half, in other words, a distribution of images in the Airy disc is reduced to half and the reduced distribution is projected on a camera.

Thereby, in the confocal optical lenses according to one aspect of the present invention, super resolution images where there are no spurious resolution and artifacts due to image processing can be obtained rapidly (in real time). The configuration of the confocal optical scanner is simple and inexpensive. The optical adjustment of the confocal optical scanner is easy and has high environmental stability.

Since such a confocal optical scanner has a super-resolution effect not only in an x-y plane of image, but also in an axial direction (z-axis direction), the confocal optical scanner is suitable for a fine observation of a three-dimensional structure of a specimen.

Although the foregoing has been a description of the confocal optical scanners according to some embodiments of the present invention, the present invention is not limited to the embodiments described above, and can be freely modified within the scope of the present invention.

The confocal optical scanners according to all of the embodiments are applicable to, not only a reflective confocal observation and a single-photon fluorescence confocal observation, but also a multi-photon fluorescence observation. Using the confocal optical scanners according to the embodiments, super resolution multi-photon fluorescent images can be imaged.

What is claimed is:

1. A confocal optical scanner for a microscope comprising an optical filter, the optical filter comprising:
   a plate-shaped body including a first surface and a second surface opposite to the first surface, the first surface having a plurality of pinholes; and
   a plurality of first microlenses on the second surface, the first microlenses being disposed nearly coaxially with the pinholes, respectively,
   wherein the optical filter is configured to increase a numerical aperture of light input from a specimen and to output the light having the increased numerical aperture.

2. The confocal optical scanner for the microscope according to claim 1, wherein the confocal optical scanner further comprises a motor connected to the body and configured to rotate the optical filter,
the optical filter is a disk-shaped filter,
each first microlens is a convex lens, and
the second surface of the body faces the specimen.

3. The confocal optical scanner for the microscope according to claim 1, wherein the confocal optical scanner further comprises:
a light source device configured to output illumination light for illuminating the specimen; and
a galvanic mirror configured to reflect the illumination light output from the light source device, and a direction of a surface of the galvanic mirror being variable with respect to a light axis of the illumination light,
the optical filter is an array type filter,
each first microlens is a convex lens, and
the second surface of the body is disposed to receive return light from the specimen.

4. The confocal optical scanner for the microscope according to claim 1, wherein the confocal optical scanner further comprises a motor connected to the body and configured to rotate the optical filter,
the optical filter is a disk-shaped filter,
each first microlens is a convex lens,
the second surface of the body faces the specimen,
the optical filter includes concave mirrors disposed on the first surface of the body, and
each pinhole is disposed coaxially with the center of each concave mirror.

5. The confocal optical scanner for the microscope according to claim 1, wherein the confocal optical scanner further comprises an intermediate variable magnification optical system.

6. The confocal optical scanner for the microscope according to claim 5, wherein the intermediate variable magnification optical system comprises a first lens and a second lens.

7. The confocal optical scanner for the microscope according to claim 6, wherein the intermediate variable magnification optical system is configured to increase a numerical aperture of light input from the first lens and to output the light having the increased numerical aperture from the second lens and to reduce a numerical aperture of light input from the second lens and to output the light having the reduced numerical aperture from the first lens.

8. The confocal optical scanner for the microscope according to claim 1, wherein the optical filter is configured to increase the numerical aperture of the light input from the specimen in the range of 1.2 times to 4 times as large as before, and to output the light having the increased numerical aperture.

9. The confocal optical scanner for the microscope according to claim 1, wherein the optical filter includes a light shielding mask disposed on the first surface of the body, and
each pinhole is an opening of the light shielding mask.

10. The confocal optical scanner for the microscope according to claim 1, wherein
the confocal optical scanner further comprises a microlens disk opposite to the optical filter, and
a plurality of second microlenses is disposed on the microlens disk.

11. The confocal optical scanner for the microscope according to claim 10, wherein
each second microlens is configured to divide illumination light into a plurality of illumination light beamlets, and
each pinhole of the body is configured to allow one illumination light beamlet of the illumination light beamlets, which has been passed through the second microlens positioned opposite to the pinhole, to pass through.

12. The confocal optical scanner for the microscope according to claim 11, wherein each first microlens is configured to reduce a numerical aperture of the illumination light beamlet and to output the illumination light beamlet having the reduced numerical aperture.

13. A confocal optical scanner for a microscope comprising:
an optical filter, the optical filter comprising:
a plate-shaped body including a first surface and a second surface opposite to the first surface, the first surface having a plurality of pinholes; and
a plurality of first microlenses on the second surface, the first microlenses being disposed nearly coaxially with the pinholes, respectively, and
a motor connected to the body and configured to rotate the optical filter,
wherein
the optical filter is a disk-shaped filter,
each first microlens is a concave lens, and
the first surface of the body faces a specimen.

14. A confocal optical scanner for a microscope comprising:
an optical filter, the optical filter comprising:
a plate-shaped body including a first surface and a second surface opposite to the first surface, the first surface having a plurality of pinholes; and
a plurality of first microlenses on the second surface, the first microlenses being disposed nearly coaxially with the pinholes, respectively,
a light source device configured to output illumination light for illuminating a specimen; and
a galvanic mirror configured to reflect the illumination light output from the light source device, and a direction of a surface of the galvanic mirror being variable with respect to a light axis of the illumination light,
wherein
the optical filter is an array type filter,
each first microlens is a concave lens, and
the first surface of the body is disposed to receive return light from the specimen.

* * * * *